(12) United States Patent
Furukawa et al.

(10) Patent No.: US 9,187,640 B2
(45) Date of Patent: Nov. 17, 2015

(54) POLYPHENYLENE ETHER-BASED RESIN COMPOSITION AND METHOD FOR PRODUCING THE SAME

(75) Inventors: Hiroaki Furukawa, Tokyo (JP); Tadayuki Ishii, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 0 days.

(21) Appl. No.: 14/127,775

(22) PCT Filed: Jun. 20, 2012

(86) PCT No.: PCT/JP2012/065726
§ 371 (c)(1),
(2), (4) Date: Mar. 19, 2014

(87) PCT Pub. No.: WO2012/176798
PCT Pub. Date: Dec. 27, 2012

(65) Prior Publication Data
US 2014/0200294 A1    Jul. 17, 2014

(30) Foreign Application Priority Data
Jun. 20, 2011  (JP) ................................ 2011-136688

(51) Int. Cl.
| C08L 71/12 | (2006.01) |
| C08K 5/521 | (2006.01) |
| C08L 25/02 | (2006.01) |
| C08L 53/02 | (2006.01) |
| C08L 71/10 | (2006.01) |
| C08K 5/523 | (2006.01) |

(52) U.S. Cl.
CPC .............. *C08L 71/10* (2013.01); *C08L 71/12* (2013.01); *C08K 5/523* (2013.01); *C08L 53/02* (2013.01)

(58) Field of Classification Search
CPC ........................................................ C08K 5/523
USPC .......................................... 524/127, 140, 141
See application file for complete search history.

(56) References Cited

U.S. PATENT DOCUMENTS

| 5,159,027 | A | 10/1992 | Kanayama et al. |
| 5,214,109 | A | 5/1993 | Gallucci et al. |
| 5,216,089 | A | 6/1993 | Gallucci et al. |
| 5,397,822 | A | 3/1995 | Lee, Jr. |
| RE35,695 | E | 12/1997 | Kanayama et al. |
| 7,524,894 | B2 * | 4/2009 | Sato et al. ............. 524/127 |
| 7,585,906 | B2 * | 9/2009 | Klei et al. ............. 524/127 |
| 2003/0125430 | A1 | 7/2003 | Adedeji et al. |
| 2004/0235993 | A1 * | 11/2004 | Yoshida et al. ............. 524/115 |
| 2005/0080185 | A1 | 4/2005 | Mhetar |
| 2008/0190447 | A1 | 8/2008 | Simonette |
| 2008/0203366 | A1 | 8/2008 | Blackburn et al. |
| 2011/0232963 | A1 | 9/2011 | Kono et al. |

FOREIGN PATENT DOCUMENTS

| EP | 0 257 486 A1 | 3/1988 |
| EP | 2048198 A1 | 4/2009 |
| EP | 2 360 210 A1 | 10/2009 |
| JP | 59-59724 A | 4/1984 |
| JP | 63-301222 A | 12/1988 |
| JP | 2-276823 A | 11/1990 |
| JP | 5-1253 A | 1/1993 |
| JP | 9-227774 A | 9/1997 |
| JP | 10-087984 A | 4/1998 |
| JP | 63-108059 A | 5/1998 |
| JP | 2001-139798 A | 5/2001 |
| JP | 2004-137450 A | 5/2004 |
| JP | 3735966 B | 11/2005 |
| JP | 2006-299235 A | 11/2006 |
| JP | 2008-274035 A | 11/2008 |
| JP | 2008-299235 A | 12/2008 |
| JP | 2009-197196 A | 9/2009 |
| JP | 2010-123933 A | 4/2010 |
| JP | 2010-519389 A | 6/2010 |
| JP | 2011104809 A * | 6/2011 |
| JP | 2011-252097 A | 12/2011 |
| WO | 2005/117141 A1 | 12/2005 |
| WO | 2010/047122 A1 | 4/2010 |

OTHER PUBLICATIONS

JP2011-104809 English Machine Translation Jul. 3, 2015.*
Search Report from International Application No. PCT/JP2012/053301, mail date is Apr. 3, 2012.
Search Report from International Application No. PCT/JP2012/065726, mail date is Sep. 25, 2012.
Supplementary European Search Report issued with respect to application No. 12802174.8, mail date is Sep. 4, 2015.

* cited by examiner

*Primary Examiner* — Randy Gulakowski
*Assistant Examiner* — Christopher M Rodd
(74) *Attorney, Agent, or Firm* — Greenblum & Bernstein, P.L.C.

(57) ABSTRACT

To provide a resin composition that has a high impact resistance, hardly causes peeling during molding, and is excellent in flame retardancy, heat resistance, and heat aging resistance for a long period. A resin composition containing (A) polyphenylene ether, (B) a hydrogenated block copolymer that is obtained by hydrogenating a block copolymer including a polystyrene block and a conjugated diene compound polymer block, and that has a weight average molecular weight of 100,000 to 500,000, and (C) an organic phosphorus-based flame retardant within a specified amount, wherein a value of the loss tangent (tan δ) peak height of the (B) component in a dynamic viscoelasticity spectrum obtained by measurement of the resin composition at a frequency of 10 Hz is in a specified range.

17 Claims, 2 Drawing Sheets

US 9,187,640 B2

POLYPHENYLENE ETHER-BASED RESIN COMPOSITION AND METHOD FOR PRODUCING THE SAME

TECHNICAL FIELD

The present invention relates to a polyphenylene ether-based resin composition and a method for producing the same.

BACKGROUND ART

A polyphenylene ether-based resin composition (hereinafter, also referred to as "m-PPE resin composition") based on a polyphenylene ether (hereinafter, also referred to as "PPE")-based resin has improved molding processability and a predetermined heat resistance, is also excellent in electrical properties, dimensional stability, impact resistance, acid resistance and alkali resistance, and is low in water-absorbing property and specific gravity. In addition, since the m-PPE resin composition can achieve flame retardancy using no harmful halogen-based compound and antimony compound, it is also excellent in terms of environment as well as health and safety. Therefore, such an m-PPE resin composition is widely utilized in applications such as various electric/electronic parts, office equipment parts, automobile parts, building materials, various other exterior materials, and industrial goods.

Patent Document 1 discloses a polymer mixture using a hydrogenated styrene-butadiene-styrene block copolymer and no polystyrene.

Patent Document 2 discloses a composition containing a hydrogenated styrene-butadiene-styrene block copolymer having a specified circle-equivalent average particle diameter.

Patent Document 3 discloses a flame-retardant composition using a hydrogenated styrene-butadiene-styrene block copolymer having a molecular weight of 200,000 atomic mass units to 400,000 atomic mass units.

Patent Document 4 discloses a production method in which, when a flame-retardant composition including a hydrogenated styrene-butadiene-styrene block copolymer having a number average molecular weight of 150,000 to 350,000 is molten and kneaded using an extruder, the range from the upstream side of the extruder to 45 to 75% of the extruder length is defined as a non-melting and mixing zone, and a melting and kneading zone having 5 to 30% of the extruder length is provided downstream of the non-melting and mixing zone.

Patent Document 5 discloses a method for producing a resin composition using a polyphenylene ether powder, wherein a specified powder-supply facility location and specified extruding conditions are adopted.

Patent Documents

Patent Document 1: Japanese Patent Laid-Open Publication No. 09-227774
Patent Document 2: Japanese Patent No. 3735966
Patent Document 3: National Japanese Publication of International Patent Application No. 2010-519389
Patent Document 4: Japanese Patent Laid-Open Publication No. 2008-274035
Patent Document 5: Japanese Patent Laid-Open Publication No. 2004-137450

SUMMARY OF THE INVENTION

Problems to be Solved by the Invention

Not only in applications for electric/electronic inner parts and automobile parts but also for materials for connectors and junction boxes of solar batteries which has been increasingly developed in recent years, there have been demands of higher heat aging resistance (such a property that performances are maintained even under exposure to a high-temperature use environment for a long period of time), heat resistance and flame retardancy. However, the above polyphenylene ether-based resin compositions do not exhibit sufficient performances for these applications.

For example, in order to allow the resin composition described in each of Patent Document 1 and Patent Document 2 to have an increased impact resistance, the amount of the block copolymer added is required to be increased. However, as the amount of the block copolymer added is increased, peeling during molding is easily caused. Therefore, there is a problem that even if a resin composition having a high impact resistance is obtained, it does not have sufficient properties for practical use.

According to the technique described in Patent Document 3, as the molecular weight of the block copolymer contained in the flame-retardant composition is increased, peeling during molding is easily caused, and therefore, there is a problem that no product having sufficient properties for practical use cannot be obtained.

In the case of the production method described in Patent Document 4, the non-melting and mixing zone and the melting and kneading zone that follows it are provided in the extruder, and thus improvements in impact resistance and heat aging resistance are expected. However, the method is not a sufficient method for practical use, after all, from the viewpoint of preventing peeling during molding.

The technique described in Patent Document 5 is a technique for improving productivity by dividing a production step of a resin composition mainly including a polyphenylene ether powder, a polystyrene-based resin and a solid flame retardant into two steps, but the improvement in physical properties is not sufficient.

The present invention has been made under such circumstances, and an object thereof is to provide a resin composition that has a high impact resistance, that hardly causes peeling during molding, and that is excellent in flame retardancy, heat resistance, and heat aging resistance for a long period.

Means for Solving the Problems

The present inventors have intensively studied in order to solve the above problems, and as a result, have found that the problems can be solved by a resin composition wherein the resin composition contains polyphenylene ether, a specified hydrogenated block copolymer and an organic phosphorus-based flame retardant in a specified ratio, and the value of the loss tangent (tan δ) peak height of the hydrogenated block copolymer in a dynamic viscoelasticity spectrum obtained by measurement of the resin composition at a frequency of 10 Hz is in a specified range, thereby leading to the completion of the present invention.

That is, the present invention is as follows.

[1]
A resin composition comprising (A) polyphenyleneether, (B) a hydrogenated block copolymer which is obtained by hydrogenating a block copolymer including a polystyrene block and a conjugated diene compound polymer block, and which has a weight average molecular weight of 100,000 to 500,000, and (C) an organic phosphorus-based flame retardant, wherein the resin composition comprises, based on 100 parts by mass of a total amount of the (A) component, the (B) component and the (C) component, 57 to 94 parts by mass of the (A) component,
3 to 30 parts by mass of the (B) component, and
3 to 30 parts by mass of the (C) component; and
wherein a value of a loss tangent (tan δ) peak height of the (B) component, represented by the following equation 1, in a dynamic viscoelasticity spectrum obtained by measurement of the resin composition at a frequency of 10 Hz is in a range of 0.075 to 0.120.

(Loss tangent (tan δ) peak height of ($B$) component)=
(Peak height in chart)/(Content (% by mass) of
($B$) component in resin composition)     (Equation 1)

[2]
The resin composition according to [1], further comprising 0.5 to 20 parts by mass of (D) a styrene-based resin based on 100 parts by mass of the total amount of the (A) component, the (B) component and the (C) component.

[3]
The resin composition according to [1] or [2], comprising, based on 100 parts by mass of the total amount of the (A) component, the (B) component, the (C) component and the (D) component, 65 to 90 parts by mass of the (A) component,
4 to 25 parts by mass of the (B) component,
5 to 25 parts by mass of the (C) component, and
0.5 to 20 parts by mass of the (D) component.

[4]
The resin composition according to any of [1] to [3], wherein the value of the loss tangent (tan δ) peak height of the (B) component in a dynamic viscoelasticity spectrum obtained by measurement of the resin composition at a frequency of 10 Hz is in a range of 0.090 to 0.115.

[5]
The resin composition according to any of [1] to [4], further comprising 0.001 to 0.1 parts by mass of (E) a heat stabilizer based on 100 parts by mass of the (B) component.

[6]
The resin composition according to any of [1] to [5], wherein the content of the polystyrene block in the (B) component is 20 to 50% by mass.

[7]
The resin composition according to any of [1] to [6], containing as the (C) component a condensed phosphate compound represented by formula (I).

(wherein $Q^1$, $Q^2$, $Q^3$ and $Q^4$ each independently represent an alkyl group having 1 to 6 carbon atoms, n is an integer of 1 or more, $n^1$ and $n^2$ are each independently an integer of 0 to 2, and $m^1$, $m^2$, $m^3$ and $m^4$ are each independently an integer of 0 to 3.)

[8]
The resin composition according to any of [1] to [7], further comprising (F) an ultraviolet absorber and/or a light stabilizer in an amount of 0.01 to 3 parts by mass in total based on 100 parts by mass of the total amount of the (A) component, the (B) component and the (C) component.

[9]
A method for producing the resin composition according to any of [1] to [8], comprising a step of melting and kneading the (A) component, the (B) component and the (C) component using a twin screw extruder, wherein a temperature of a molten resin composition extruded from a die outlet of a twin screw extruder is 300 to 350° C.

[10]
The method for producing the resin composition according to [9], wherein in the melting and kneading step, an oxygen concentration at least one raw material supply port of the twin screw extruder is set to 3% or less.

[11]
The method for producing the resin composition according to [9] or [10], wherein when an entire barrel length of the twin screw extruder is assumed to be 100%, a range from an upstream side of a barrel to at least 40% of a barrel length is defined as a former part of the barrel and a remaining range is defined as a latter part of the barrel, a barrel setting temperature of the former part of the barrel is set to a temperature equal to or lower than the glass transition temperature (Tg) of the (A) polyphenylene ether, and a barrel setting temperature of the latter part of the barrel is set to 240 to 320° C.

[12]
The method for producing the resin composition according to any of [9] to [11], wherein the former part of the barrel comprises a screw configuration in which no element other than a forward-conveying (right-handed screw element) screw element and a forward-conveying (phase of less than 45 degrees) kneading element is used, and the latter part of the barrel comprises a screw configuration having at least two of a forward-conveying (phase of less than 45 degrees) kneading element as an essential member, and a neutral (phase of 90 degrees) kneading element, a backward-conveying (negative phase of less than 45 degrees) kneading element and a backward-conveying (left-handed screw element) screw element.

[13]

The method for producing the resin composition according to any of [9] to [12], wherein the twin screw extruder further comprises a second raw material supply port in the latter part of the barrel, and the (D) component is supplied from the second raw material supply port.

[14]

A molded body comprising the resin composition according to any of [1] to [8].

[15]

A solar battery module part comprising the resin composition according to any of [1] to [8].

[16]

A connector comprising the resin composition according to any of [1] to [8].

[17]

A junction box comprising the resin composition according to any of [1] to [8].

Advantageous Effects of the Invention

The present invention can provide a resin composition that has a high impact resistance, that hardly causes peeling during molding, and that is excellent in flame retardancy, heat resistance, and heat aging resistance for a long period, as well as a molded body thereof.

MODES FOR CARRYING OUT THE INVENTION

Figure 1:
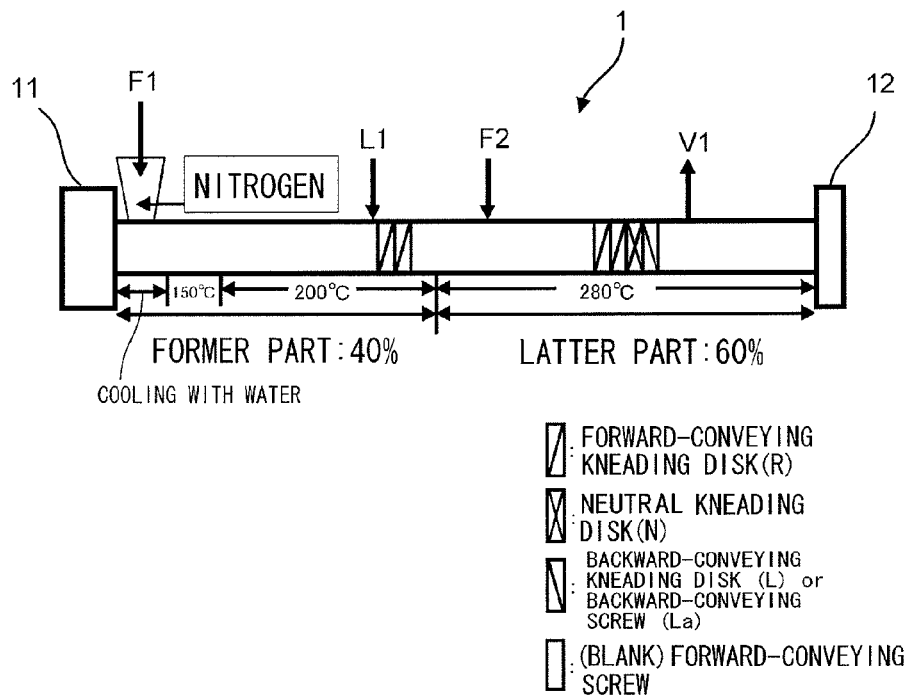
FIG. 1 illustrates a schematic diagram of one embodiment of a method for producing a resin composition of the present embodiment.

Hereinafter, an embodiment for carrying out the present invention (hereinafter, simply referred to as "the present embodiment") will be described in detail with reference to the drawings, if necessary. The present embodiment below is illustrative for describing the present invention, and is not intended to limit the present invention to the following content. The present invention can be performed with being appropriately modified within the scope thereof. Herein, positional relationships such as up, down, left, and right in the drawings are based on positional relationships illustrated in the drawings unless otherwise specified. Further, dimensional ratios and configuration in the drawings are not limited to contents illustrated in the drawings.

A resin composition of the present embodiment contains (A) polyphenylene ether, (B) a hydrogenated block copolymer that is obtained by hydrogenating a block copolymer including a polystyrene block and a conjugated diene compound polymer block, and that has a weight average molecular weight of 100,000 to 500,000, and (C) an organic phosphorus-based flame retardant, wherein the resin composition contains, based on 100 parts by mass of the total amount of the (A) component, (B) component and (C) component, 57 to 94 parts by mass of the (A) component, 3 to 30 parts by mass of the (B) component, and 3 to 30 parts by mass of the (C) component, and wherein the value of the loss tangent (tan δ) peak height of the (B) component (hereinafter, sometimes simply referred to as "tan δ peak height"), represented by the following equation 1, in a dynamic viscoelasticity spectrum obtained by measurement of the resin composition at a frequency of 10 Hz is in the range of 0.075 to 0.120.

(Loss tangent (tan δ) peak height of (B) component)= (Peak height in chart)/(Content (% by mass) of (B) component in resin composition)     (Equation 1)

First, the respective components for use in the resin composition are described.

[(A) Polyphenylene Ether]

(A) The polyphenylene ether is preferably a homopolymer or copolymer having repeating unit(s) represented by the following formula (II) and/or formula (III) (unmodified polyphenylene ether); or a homopolymer or copolymer in which the homopolymer or the copolymer is partially or entirely modified by an unsaturated carboxylic acid or a derivative thereof (modified polyphenylene ether). In the present description, so-called unmodified polyphenylene ether and modified polyphenylene ether are collectively called "polyphenylene ether" in some cases. Unmodified polyphenylene ether and modified polyphenylene ether will be described in detail below.

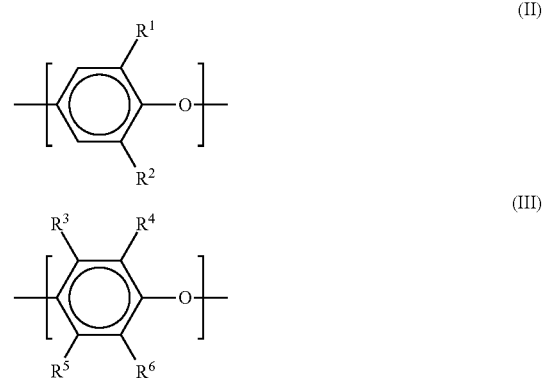

(wherein $R^1$, $R^2$, $R^3$, $R^4$, $R^5$ and $R^6$ each independently represent a hydrogen atom, an alkyl group having 1 to 4 carbon atoms, an aryl group having 6 to 9 carbon atoms or a halogen atom. However, $R^5$ and $R^6$ are not a hydrogen atom at the same time. $R^1$ to $R^6$ may be substituted or unsubstituted.)

Specific examples of the unmodified polyphenylene ether homopolymer may include, but not particularly limited to, poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether, poly(2-methyl-6-hydroxyethyl-1,4-phenylene)ether, and poly(2-methyl-6-chloroethyl-1,4-phenylene)ether. Among them, poly(2,6-dimethyl-1,4-phenylene)ether is preferred in terms of productivity, extrudability and molding processability.

The unmodified polyphenylene ether copolymer may include a copolymer having repeating unit(s) represented by formula (II) and/or formula (III) as a main repeating unit. The "main repeating unit" here means a repeating unit contained in the copolymer in an amount of 50% by mol or more, preferably 70% by mol or more, more preferably 90% by mol or more.

Specific examples of the polyphenylene ether copolymer may include, not particularly limited to, a copolymer of 2,6-dimethylphenol and 2,3,6-trimethylphenol, a copolymer of 2,6-dimethylphenol and o-cresol, and a copolymer of 2,6-dimethylphenol, 2,3,6-trimethylphenol and o-cresol.

In addition, a polyphenylene ether copolymer is preferable which has, as a part of the main repeating unit, a 2-(dialkylaminomethyl)-6-methylphenylene ether monomer unit, a 2-(N-alkyl-N-phenylaminomethyl)-6-methylphenylene ether monomer unit, or the like as a monomer unit of the polyphenylene ether copolymer. As the polyphenylene ether copolymer, for example, one described in Japanese Patent Laid-Open Publication No. 63-301222 can be used.

Examples of the 2-(dialkylaminomethyl)-6-methylphenylene ether monomer unit may include 2-(dibutylaminomethyl)-6-methylphenylene ether, 2-(ethylbutylaminomethyl)-6-methylphenylene ether, 2-(dipropylaminomethyl)-6-methylphenylene ether, and 2-(butylpropylaminomethyl)-6-methylphenylene ether.

The reduced viscosity of the (A) component (chloroform solution, measured at 30° C.) is preferably 0.25 to 0.6 dL/g and more preferably 0.35 to 0.55 dL/g in terms of productivity, moldability and quality performance.

The resin composition of the present embodiment may include, as the (A) component, modified polyphenylene ether in which the above-described unmodified polyphenylene ether is partially or entirely modified by an unsaturated carboxylic acid or a derivative thereof. The (A) component may be the above-described unmodified polyphenylene ether, modified polyphenylene ether, or both thereof.

The modified polyphenylene ether is not particularly limited, and known modified polyphenylene ether can also be used to such an extent that there is no adverse effect on peeling property and other physical properties of the resin composition. As such modified polyphenylene ether, for example, one described in Japanese Patent Laid-Open Publication No. 02-276823, Japanese Patent Laid-Open Publication No. 63-108059, Japanese Patent Laid-Open Publication No. 59-059724, or the like can be used.

A method for producing the modified polyphenylene ether is not particularly limited, and a known method can be adopted. For example, the modified polyphenylene ether can be produced by melting and kneading the above-described unmodified polyphenylene ether and an unsaturated carboxylic acid or a derivative thereof in the presence or absence of a radical initiator for reaction. Alternatively, it can be produced by dissolving in an organic solvent unmodified polyphenylene ether and an unsaturated carboxylic acid or a derivative thereof in the presence or absence of a radical initiator to afford a solution, and reacting them in the solution.

Specific examples of the unsaturated carboxylic acid or the derivative thereof may include, not particularly limited to, dicarboxylic acids such as maleic acid, fumaric acid, itaconic acid, halogenated maleic acid, cis-4-cyclohexene-1,2-dicarboxylic acid and endo-cis-bicyclo(2,2,1)-5-heptene-2,3-dicarboxylic acid, and acid anhydrides, esters, amides and imides of these dicarboxylic acids; and monocarboxylic acids such as acrylic acid and methacrylic acid, and esters and amides of these monocarboxylic acids. In addition, even if being a saturated carboxylic acid, a compound can also be used in the present embodiment, which can be pyrolyzed by itself at the reaction temperature during the production of the modified polyphenylene ether to be converted into an unsaturated carboxylic acid derivative. Specific examples of such a saturated carboxylic acid may include, not particularly limited to, malic acid and citric acid. These may be used alone or in combination of two or more thereof.

Preferable specific examples of the modified polyphenylene ether may include maleic acid-modified polyphenylene ether and stearyl acrylate-modified polyphenylene ether.

The (A) component is preferably in the form of powder when it is a raw material before being compounded to the resin composition. The "powder" here means a powder having an average particle size of 1 to 2000 µm. The average particle size of the powder is preferably 1 to 1000 µm, more preferably 10 to 700 µm, and further preferably 100 to 500 µm. The lower limit of the average particle size is 1 µm or more in terms of handleability at the time of processing, and the upper limit of the average particle size is preferably 1000 µm or less from the viewpoint of suppressing the formation of a non-molten product at the time of melting and kneading. The "average particle size" here means one obtained by the particle size measurement by sieving.

In the resin composition of the present embodiment, the content of the (A) component is 57 to 94 parts by mass and preferably 65 to 90 parts by mass based on 100 parts by mass of the total amount of the (A) component, (B) component and (C) component. If the content of the (A) component is less than 57 parts by mass, the heat resistant temperature is lowered and heat aging resistance is inferior. In addition, if the content of the (A) component is more than 94 parts by mass, impact resistance and flame retardancy are not sufficient.

In the case where the resin composition of the present embodiment contains the (A) to (D) components, the content of the (A) component is preferably 57 to 94 parts by mass and more preferably 65 to 90 parts by mass based on 100 parts by mass of the total amount of the (A) component, (B) component, (C) component and (D) component. If the content of the (A) component is the above lower limit or more, a higher heat resistant temperature and a more excellent heat aging resistance are achieved. In addition, if the content of the (A) component is the above upper limit or less, more excellent impact resistance and flame retardancy are achieved.

[(B) Hydrogenated Block Copolymer]

(B) The hydrogenated block copolymer is a hydrogenated block copolymer that is obtained by hydrogenating a block copolymer including a polystyrene block and a conjugated diene compound polymer block, and that has a weight average molecular weight of 100,000 to 500,000. The "weight average molecular weight" here means the weight average molecular weight of the (B) component in the resin composition after the formation of the resin composition, and can be analyzed and measured from the resin composition by a method described later.

The structure of the block copolymer before hydrogenation may be, not particularly limited to, for example, a structure represented by S-B-S, S-B-S-B, (S-B-)$_4$-S, or S-B-S-B-S wherein a styrene block chain is designated as S and a conjugated diene compound polymer block chain is designated as B.

The hydrogenation rate of unsaturated bonds derived from the conjugated diene compound is preferably 60% or more, more preferably 80% or more, and further preferably 95% or more. The hydrogenation rate here can be determined by a nuclear magnetic resonance apparatus (NMR).

The microstructure of the conjugated diene compound polymer block is not particularly limited and can be arbitrarily selected. Usually, the amount of vinyl bonds (proportion of 1,2-vinyl bond and 3,4-vinyl bond incorporated in conjugated diene in 1,2-vinyl bond, 3,4-vinyl bond and 1,4-vinyl bond incorporated therein) is preferably 2 to 60% and more preferably 8 to 40%. The "amount of vinyl bonds" here can be determined by a nuclear magnetic resonance apparatus (NMR). The amount of vinyl bonds in the hydrogenated block copolymer can be determined by dissolving the resin composition in a solvent such as chloroform and measuring the obtained solution in a nuclear magnetic resonance apparatus (NMR).

The above-described weight average molecular weight of the (B) component in the resin composition after the formation of the resin composition is 100,000 to 500,000, preferably 150,000 to 370,000, and more preferably 250,000 to 370,000. If the weight average molecular weight of the (B) component is less than 100,000, sufficient impact resistance cannot be achieved, and if the weight average molecular weight of the (B) component is more than 500,000, a uniform dispersion state is not achieved, peeling during molding is easily caused, and impact resistance tends to be lowered. The "degradation" used herein means, for example, such a phenomenon that molecular chains of the (B) component are cleaved by a radical reaction or the like to cause the formation of low molecular compounds and the reduction in molecular weight.

Herein, the weight average molecular weight of the (B) component as a raw material before the formation of the resin composition is not particularly limited, but is preferably 110,000 to 520,000, more preferably 160,000 to 400,000, and further preferably 300,000 to 400,000. If the weight average molecular weight of the (B) component is the above lower limit or more, a much more excellent impact resistance can be achieved. On the other hand, if the weight average molecular weight of the (B) component is the above upper limit or less, not only load at the time of melting and extruding can be much more reduced and the molecular cleavage of the (B) component can be much more suppressed, but also the (B) component tends to be in the uniform dispersion state and a resin composition exhibiting a much more excellent impact resistance can be easily achieved (however, the function effects of the present embodiment are not limited thereto.).

The weight average molecular weight of the (B) component can be determined as a molecular weight in terms of styrene by gel permeation chromatography (GPC). Specifically, the weight average molecular weight of the (B) component in the resin composition after the formation of the resin composition can be determined by dissolving the resin composition in a solvent such as chloroform, subjecting the obtained solution to high-performance liquid chromatography (HPLC) to isolate a component corresponding the (B) component from the resin composition, and measuring the component by GPC. The weight average molecular weight of the (B) component as a raw material before the formation of the resin composition can be determined by dissolving the resin composition in a solvent such as chloroform and measuring the obtained solution by GPC.

The weight average molecular weight of at least one polystyrene block chain in the (B) component is preferably 15,000 or more and more preferably 20,000 to 70,000. Further preferably, the weight average molecular weight of all polystyrene block chains in the (B) component is 15,000 or more. When the weight average molecular weight of the polystyrene block chains in the (B) component is in the above range, a sufficient impact resistance can be achieved, and the degradation of the (B) component can be sufficiently and easily suppressed. The "weight average molecular weight of the polystyrene block chains" here can be measured as a molecular weight in terms of styrene by gel permeation chromatography (GPC).

The content of the polystyrene block in the (B) component is not particularly limited, but is preferably 20 to 50% by mass and more preferably 20 to 40% by mass from the viewpoint of more easily exhibiting impact resistance. The content of the polystyrene block in the (B) component can be measured by, for example, the following method. The content of the polystyrene block can be determined based on the following equation from the mass of the polystyrene block (wherein a styrene polymer having an average degree of polymerization of about 30 or less is excluded.), obtained by a method for oxidative decomposition of a copolymer before hydrogenation by tert-butyl hydroperoxide using osmium tetroxide as a catalyst (method described in I. M. Kolthoff, et al., J. Polym. Sci. 1, 429 (1946), hereinafter, "osmium tetroxide decomposition method").

Content (% by mass) of polystyrene block=(Mass of polystyrene block in copolymer before hydrogenation/Mass of copolymer before hydrogenation)×100

The content of the conjugated diene compound polymer block affects the value of the tan δ peak height of the (B) component. For example, in the case where the (B) component is a hydrogenated block copolymer of a copolymer including a polystyrene block and a conjugated diene compound polymer block, the content of the conjugated diene compound polymer block is 50 to 80% by mass if the content of the polystyrene block is 20 to 50% by mass, as described above. If (E) a heat stabilizer is added to such a hydrogenated block copolymer in a large amount usually used, and the resultant is molten and kneaded, the value of the tan δ peak height of the (B) component tends to exceed 0.120. On the other hand, even in the case of the same content of the conjugated diene compound polymer block, the (B) component is moderately degraded under the control of the amount of (E) the heat stabilizer, melting and kneading conditions, and the like, as described later in detail, to thereby enable to control the value of the tan δ peak height of the (B) component to a desired value with a high degree of accuracy (however, the function effects of the present embodiment are not limited thereto).

As the (B) component, two or more hydrogenated block copolymers having different composition and structure can also be simultaneously used. For example, a combination of hydrogenated block copolymers having a different block content, such as a combination of a hydrogenated block copolymer having a polystyrene block content of 50% or more and a hydrogenated block copolymer having a polystyrene block content of 30% or less; or a combination of hydrogenated random block copolymers obtained by hydrogenating a block copolymer containing a random copolymer block of styrene and conjugated diene can be used. The (B) component may be one obtained by hydrogenating a block copolymer including a polystyrene block and a conjugated diene compound polymer block, but is preferably one (hydrogenated block copolymer) obtained by hydrogenating a block copolymer including a polystyrene block and a conjugated diene compound polymer block.

In the resin composition of the present embodiment, the content of the (B) component is 3 to 30 parts by mass, preferably 4 to 25 parts by mass, more preferably 5 to 20 parts by mass, and further preferably 10 to 20 parts by mass, based on 100 parts by mass of the total amount of the (A) component, (B) component and (C) component. If the content of the (B) component is less than 3 parts by mass, a sufficient impact resistance cannot be achieved, and if the content thereof is more than 30 parts by mass, not only impact resistance is not achieved but also rigidity such as bending elastic modulus or bending strength is not sufficient.

In the case where the resin composition of the present embodiment contains the (A) to (D) components, the content of the (B) component is preferably 3 to 30 parts by mass, more preferably 4 to 25 parts by mass, further preferably 5 to 20 parts by mass, and furthermore preferably 10 to 20 parts by mass, based on 100 parts by mass of the total amount of the (A) component, (B) component, (C) component and (D) component. If the content of the (B) component is the above lower limit or more, a more excellent impact strength is achieved, and if the content is the above upper limit or less, a more excellent impact resistance is achieved, and rigidity such as bending elastic modulus or bending strength is more excellent.

In the resin composition of the present embodiment, the (B) component and (G) a polyolefin described later can also be simultaneously used. The use of the (B) component and the (G) component at the same time can further enhance release ability during molding and also impact resistance. The detail of the (G) component will be described later.

[(C) Organic Phosphorus-Based Flame Retardant]

(C) The organic phosphorus-based flame retardant is a flame retardant containing at least an organic phosphorus compound. Specific examples of the organic phosphorus compound may include, not particularly limited to, a phosphate compound and a phosphazene compound.

The phosphate compound is added for enhancing flame retardancy, and a phosphate compound commonly used as a flame retardant for the (A) component can also be used.

Specific examples of the phosphate compound may include, not particularly limited to, triphenyl phosphate, trisnonylphenyl phosphate, resorcinol bis(diphenyl phosphate), resorcinol bis[di(2,6-dimethylphenyl)phosphate], 2,2-bis{4-[bis(phenoxy)phosphoryloxy]phenyl}propane, and 2,2-bis{4-[bis(methylphenoxy)phosphoryloxy]phenyl}propane.

Furthermore, specific examples of the phosphate compound other than the above may include, not particularly limited to, trimethyl phosphate, triethyl phosphate, tributyl phosphate, trioctyl phosphate, tributoxyethyl phosphate, tricresyl phosphate, cresylphenyl phosphate, octyldiphenyl phosphate, diisopropylphenyl phosphate, diphenyl-4-hydroxy-2,3,5,6-tetrabromobenzyl phosphonate, dimethyl-4-hydroxy-3,5-dibromobenzyl phosphonate, diphenyl-4-hydroxy-3,5-dibromobenzyl phosphonate, tris(chloroethyl)phosphate, tris(dichloropropyl)phosphate, tris(chloropropyl) phosphate, bis(2,3-dibromopropyl)-2,3-dichloropropyl phosphate, tris(2,3-dibromopropyl)phosphate, bis(chloropropyl)monooctyl phosphate hydroquinolyl diphenyl phosphate, phenylnonyl phenylhydroquinolyl phosphate, and phenyl dinonyl phenyl phosphate. These may be used alone or in combination of two or more.

Among the phosphate compounds, an aromatic condensed phosphate compound is preferable because it generates little gas during processing and is excellent in heat stability. As the aromatic condensed phosphate compound, a commercially available product can also be used. Examples of such a commercially available product may include those (product names "CR741", "CR733S", and "PX200" manufactured by Daihachi Chemical Industry Co., Ltd.) and those (product names "Adekastab FP-600", "Adekastab FP-700", and "Adekastab FP-800" manufactured by Adeka Corporation). A commercially available product of the aromatic condensed phosphate compound is usually a mixture of a plurality of compounds having a different degree of condensation.

Among the aromatic condensed phosphate compounds, a condensed phosphate compound represented by the following formula (I), or a condensed phosphate represented by the following formula (IV) is particularly preferable. In particular, the condensed phosphate compound represented by the formula (I) can prevent deteriorations in electrical properties and mechanical properties in use under a high humidity because it absorbs no water and is excellent in moisture resistance.

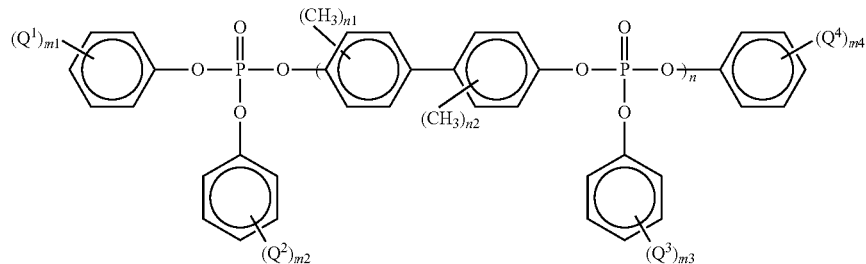

(I)

(wherein $Q^1$, $Q^2$, $Q^3$ and $Q^4$ each independently represent an alkyl group having 1 to 6 carbon atoms, n is an integer of 1 or more, $n^1$ and $n^2$ are each independently an integer of 0 to 2, and $m^1$, $m^2$, $m^3$ and $m^4$ are each independently an integer of 0 to 3.)

In the formula (I), n may be an integer of 1 or more, and is preferably an integer of 1 to 3.

Among the condensed phosphate compounds represented by the formula (I), more preferable examples of the condensed phosphate compound may include one containing, in an amount of 50% by mass or more in total, at least one of a condensed phosphate compound wherein $m^1$, $m^2$, $m^3$, $m^4$, $n^1$ and $n^2$ are 0; and a condensed phosphate compound wherein $Q^1$, $Q^2$, $Q^3$, and $Q^4$ are a methyl group, $n^1$ and $n^2$ are 0, $m^1$, $m^2$ $m^3$ m and $m^4$ are an integer of 1 to 3, and n is an integer of 1 to 3 (n is further preferably an integer of 1). As such a flame retardant, one (product name "Adekastab FP-800" manufactured by Adeka Corporation), or the like can be used.

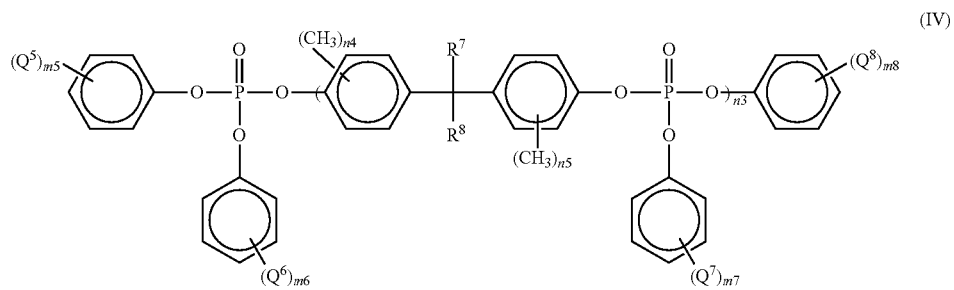

(wherein $Q^5$, $Q^6$, $Q^7$ and $Q^8$ each independently represent an alkyl group having 1 to 6 carbon atoms, $R^7$ and $R^8$ each independently represent a hydrogen atom or a methyl group, $n^3$ is an integer of 1 or more, $n^4$ and $n^5$ are each independently an integer of 0 to 2, and $m^5$, $m^6$, $m^7$ and $m^8$ are each independently an integer of 0 to 3.)

In the formula (IV), $n^3$ may be an integer of 1 or more, and is preferably an integer of 1 to 3.

Among the condensed phosphate compounds represented by the formula (IV), more preferable examples of the condensed phosphate may include one containing, in an amount of 50% by mass or more in total, at least one of a condensed phosphate wherein $R^7$ and $R^8$ are a methyl group, $m^5$, $m^6$, $m^7$, $m^8$, $n^4$ and $n^5$ are 0; and a condensed phosphate compound wherein $Q^5$, $Q^6$, $Q^7$, $Q^8$, $R^7$ and $R^8$ are a methyl group, $n^3$ is an integer of 1 to 3 ($n^3$ is further preferably an integer of 1), $n^4$ and $n^5$ are 0, and $m^5$, $m^6$, $m^7$ and $m^8$ are an integer of 1 to 3. As such a flame retardant, for example, one (product name "CR741", "CR733S", or "PX200" manufactured by Daihachi Chemical Industry Co., Ltd.), and one (product name "Adekastab FP-600" or "Adekastab FP-700" manufactured by Adeka Corporation) can be used.

The acid value of such an aromatic condensed phosphate compound (value according to JIS K2501) is not particularly limited, but is preferably 0.1 or less, more preferably 0.08 or less, and further preferably 0.05 or less in terms of flame retardancy and hydrolyzability.

As the phosphazene compound, phenoxy phosphazene and a crosslinked body thereof are preferable, and a phenoxyphosphazene compound having an acid value of 0.1 or less (value according to JIS K2501) is more preferable in terms of flame retardancy and hydrolyzability.

(C) The organic phosphorus-based flame retardant may be used alone or in combination of two or more thereof. In the resin composition of the present embodiment, the content of the (C) component is 3 to 30 parts by mass and preferably 5 to 25 parts by mass based on 100 parts by mass of the total amount of the (A) component, (B) component and (C) component. If the content of the (C) component is less than 3 parts by mass, flame retardancy is not sufficient, and if the content thereof is more than 30 parts by mass, heat resistance is deteriorated.

In the case where the resin composition of the present embodiment contains the (A) to (D) components, the content of the (C) component is preferably 3 to 30 parts by mass and more preferably 5 to 25 parts by mass based on 100 parts by mass of the total amount of the (A) component, (B) component, (C) component and (D) component. If the content of the (C) component is the above lower limit or more, more excellent flame retardancy is achieved, and if the content is the above upper limit or less, a more excellent heat resistance is achieved.

[(D) Styrene-Based Resin]

The resin composition of the present embodiment further preferably contains (D) a styrene-based resin in terms of processing flowability.

(D) The styrene-based resin means a polymer obtained by polymerizing a styrene-based compound, or a styrene-based compound and other compound co-polymerizable with the styrene-based compound in the presence or absence of a rubbery polymer.

Specific examples of the styrene-based compound may include, not particularly limited to, styrene, α-methylstyrene, 2,4-dimethylstyrene, monochlorostyrene, p-methylstyrene, p-tert-butylstyrene, and p-ethylstyrene. Among them, styrene is preferable in terms of availability, economic performance, and the like.

Specific examples of other compound co-polymerizable with the styrene-based compound may include, not particularly limited to, methacrylates such as methyl methacrylate and ethyl methacrylate; unsaturated nitrile compounds such as acrylonitrile and methacrylonitrile; and acid anhydrides such as maleic anhydride. The amount of other compound co-polymerizable therewith used is not particularly limited, but is preferably 20% by mass or less and more preferably 15% by mass or less based on the total amount of monomers of the (D) component in terms of compatibility with the (A) component.

The rubbery polymer may include, not particularly limited to, a conjugated diene-based rubber, a copolymer of a conjugated diene and an aromatic vinyl compound, and an ethylene-propylene copolymer rubber. Specifically, polybutadiene is preferable as the conjugated diene-based rubber, and a styrene-butadiene copolymer is preferable as the copolymer rubber of a conjugated diene and an aromatic vinyl compound, in terms of availability and economic performance.

The rubbery polymer may be a partially hydrogenated rubbery polymer which is partially hydrogenated. As such a partially hydrogenated rubbery polymer, a partially hydrogenated polybutadiene having a degree of unsaturation of 20 to 80%, or a polybutadiene containing a 1,4-cis bond in a proportion of 90% or more is particularly preferable. The degree of unsaturation and the 1,4-cis bond here can be measured by a nuclear magnetic resonance apparatus (NMR). In the case where the rubbery polymer is used in a polymerization reaction, the content thereof is not particularly limited, but is usually preferably 5 to 15% by mass based on 100% by mass of the total amount of the styrene-based compound and the rubbery polymer.

Specific examples of the (D) component may include, not particularly limited to, homopolystyrene, a rubber-reinforced polystyrene, a styrene-acrylonitrile copolymer (AS resin), a rubber-reinforced styrene-acrylonitrile copolymer (ABS resin), and other styrene-based copolymer. These may be used alone or in combination of two or more thereof. A combination of two or more is not particularly limited, but is preferably, for example, a combination of homopolystyrene and a rubber-reinforced polystyrene. More specifically, preferred is a combination of homopolystyrene and a rubber-reinforced polystyrene using a partially hydrogenated polybutadiene having a degree of unsaturation of 20 to 80%.

Among the above, homopolystyrene is preferable as the (D) component. As homopolystyrene, any of atactic polystyrene and syndiotactic polystyrene can be used. However, it is preferable that the rubber-reinforced polystyrene be not substantially added because it may deteriorate the heat aging resistance of the resin composition.

The content of the (D) component based on 100 parts by mass of the total amount of the (A) component, (B) component and (C) component is preferably 0.5 to 20 parts by mass, more preferably 1 to 10 parts by mass, and further preferably 3 to 5 parts by mass.

The content of the (D) component based on 100 parts by mass of the total amount of the (A) component, (B) component, (C) component and (D) component is preferably 0.5 to 20 parts by mass. The upper limit of the content of the (D) component based on 100 parts by mass of the total amount of the (A) component, (B) component, (C) component and (D) component is more preferably 10 parts by mass or less and further preferably 5 parts by mass or less. The lower limit of the content of the (D) component based on 100 parts by mass of the total amount of the (A) component, (B) component, (C) component and (D) component is more preferably 1 part by mass or more and further preferably 3 parts by mass or more. When the content of the (D) component is set to the above upper limit or less, much more excellent heat resistance and flame retardancy can be achieved, and when the content is set to the above lower limit or more, flowability can be further enhanced.

When the resin composition of the present embodiment is produced using a twin screw extruder, the (D) component can also be supplied at the same time from the same supply port at the upstream side together with the (A) component and/or (B) component, but is preferably supplied from a barrel part at least 40% or more downstream from the upstream side of an extruder barrel (corresponding to the latter part of the barrel). The (D) component can be supplied from the latter part of the barrel to thereby further suppress the decomposition of the (D) component. This is preferable because of further enhancing heat aging resistance. The detail will be described in the section of a production method described later.

[(E) Heat Stabilizer]

The resin composition of the present embodiment preferably further contains (E) a heat stabilizer. The addition of the (E) component makes it possible to control the degradation of the (B) component and to suppress peeling during molding. The (E) component is not particularly limited, and a known stabilizer can be used therefor, but is preferably a hindered phenol-based heat stabilizer (antioxidant).

Specific examples of the hindered phenol-based heat stabilizer may include, not particularly limited to, 2,6-di-tert-butyl-4-methylphenol, pentaerythritol tetrakis[3-(3,5-di-tert-butyl-4-hydroxyphenyl)propionate], n-octadecyl-3-(3,5-di-tert-butyl-4-hydroxyphenyl)propionate, 2,2'-methylenebis(4-methyl-6-tert-butylphenol), 2,6-di-tert-butyl-4-(4,6-bis(octylthio)-1,3,5-triazine-2-ylamino)phenol, 2-tert-butyl-6-(3-tert-butyl-2-hydroxy-5-methylbenzyl)-4-methylphenylacrylate, 2-[1-(2-hydroxy-3,5-di-tert-pentylphenyl)ethyl]-4,6-di-tert-pentylphenylacrylate, 4,4'-butylidenebis(3-methyl-6-tert-butylphenol), 4,4'-thiobis(3-methyl-6-tert-butylphenol), an alkylated bisphenol, tetrakis[methylene-3-(3,5-di-tert-butyl-4-hydroxyphenyl) propionate]methane, and 3,9-bis[2-[3-(3-tert-butyl-4-hydroxy-5-methylphenyl)-propionyloxy]-1,1-dimethylethyl]-2,4,8,10-tetraoxyspiro[5.5]undecane. These may be used alone or in combination of two or more thereof.

The content of the (E) component is not particularly limited, but is preferably 0.1 parts by mass or less, more preferably 0.001 to 0.1 parts by mass, further preferably 0.005 to 0.09 parts by mass, and furthermore preferably 0.01 to 0.08 parts by mass, based on 100 parts by mass of the (B) component.

A usually commercially available hydrogenated block copolymer has a heat stabilizer, such as a hindered phenol-based heat stabilizer, compounded therein in an amount of about 0.2 to 0.3 parts by mass based on 100 parts by mass of the hydrogenated block copolymer from the viewpoint of maintaining heat stability. The tan δ peak height of the (B) component is associated with the degree of degradation of the (B) component, and the detail thereof will be described later. The present inventors have found that, in a polyphenylene-based resin composition using a commercially available product of such a hydrogenated block copolymer, the hydrogenated block copolymer compounded in the polyphenylene-based resin composition is moderately degraded with difficulty unless adopted is such a severe processing condition that the processing temperature is higher, and therefore the tan δ peak height of the (B) component is controlled to a desired value with difficulty. On the other hand, the present inventors have also found that if the processing condition of the polyphenol-based resin composition using a commercially available product of the hydrogenated block copolymer is made severer, the degradation of the hydrogenated block copolymer rapidly progresses as soon as once initiated, and therefore the degree of degradation is controlled with difficulty and the tan δ peak height of the (B) component is controlled to a desired value with difficulty (however, the function effects of the present embodiment are not limited thereto.).

From such viewpoints, setting of the content of the (E) component within the above range in the present embodiment corresponds to the setting of thereof to an amount smaller than the amount of the heat stabilizer compounded in a usually commercially available hydrogenated block copolymer, or to such an extent that no heat stabilizer is compounded. As a result, processing in a milder condition is possible, the degree of degradation of the (B) component is easily controlled, and the tan δ peak height of the (B) component can be more efficiently controlled so that it is a desired value.

[(F) Ultraviolet Absorber, Light Stabilizer]

The resin composition of the present embodiment preferably further contains (F) (f1) an ultraviolet absorber and/or (f2) a light stabilizer. The resin composition contains the (F) component to thereby allow not only light resistance but also heat aging resistance to be enhanced. The reason for this is not clear, but is because it is considered that the (f1) component can absorb ultraviolet ray of a specified wavelength to thereby efficiently suppress radical generation by ultraviolet ray irradiation in a small amount, and the (f2) component can be added to thereby efficiently quench radicals generated (however, the function effects of the present embodiment are not limited thereto.).

(f1) The ultraviolet absorber is not particularly limited, and a generally commercially available ultraviolet absorber can also be used. The ultraviolet absorber is preferably a benzotriazole-based ultraviolet absorber. Specific examples of the benzotriazole-based ultraviolet absorber may include, not particularly limited to, 2-(2'-hydroxy-5'-methylphenyl)benzotriazole, 2-(3'-tert-butyl-5'-methyl-2'-hydroxyphenyl)-5-chlorobenzotriazole, 2-(2'-hydroxy-3',5'-di-tert-butylpheny)benzotriazole, 2-(2'-hydroxy-5'-tert -octylphenyl)benotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-aminophenyl)benzotriazole, 2-{2'-hydroxy-3'-(3",4",5", 6"-tetrahydrophthalimidemethyl)-5'-methylphenyl}benzotriazole, 2,2-methylenebis {4-(1,1,3,3-tetramethylbutyl)-6-(2H-benzotriazole-2-yl)phenol}, and 6-(2-benzotriazolyl)-4-tert-octyl-6'-tert-butyl-4'-methyl-2, 2'-methylenebisphenol. These may be used alone or in combination of two or more thereof.

(f2) The light stabilizer is not particularly limited, and a generally commercially available light stabilizer can also be used. The light stabilizer is preferably a hindered amine-based light stabilizer. Specific examples of the hindered amine-based light stabilizer may include, not particularly limited to, bis(2,2,6,6-tetramethyl-4-piperidyl)sebacate, bis(1-octyloxy-2,2,6,6-tetramethyl-4-piperidyl)sebacate, a polycondensate of dimethyl succinate and 1-(2-hydroxyethyl)-4-hydroxy-2,2,6,6-tetramethylpiperidine, poly[{6-(1, 1,3,3-tetramethylbutyl)amino-1,3,5-triazine-2,4-diyl}{(2,2, 6,6-tetramethyl-4-piperidyl)imino}hexamethylene{(2,2,6,6-tetramethyl-4-piperidyl)imino}], a condensate of N,N'-bis(3-aminopropyl)ethylenediamine and 2,4-bis[N-butyl-N-(1,2,2, 6,6-pentamethyl-4-piperidyl)amino]-6-chloro-1,3,5-triazine, 1,2,3,4-tetra (2,2,6,6-tetramethyl-4-piperidyl)-butanetetracarboxylate, 1,4-bis(2,2,6,6-tetramethyl-4-piperidyl)-2,3-butanedione, tris-(2,2,6,6-tetramethyl-4-piperidyl)trimellitate, 1,2,2,6,6-pentamethyl-4-piperidyl-n-octoate, 1,2,2,6,6-pentamethyl-4-piperidyl stearate, 4-hydroxy-1,2,2,6,6-pentamethylpiperidine, bis(1,2,2,6,6-pentamethyl-4-piperidinyl)sebacate, and bis(1,2,2,6,6-pentamethyl-4-piperidyl) 2-(3,5-tert-butyl-4-hydroxybenzyl)-2-n-butylmalonate. These may be used alone or in combination of two or more thereof.

In the present embodiment, (f1) the ultraviolet absorber and (f2) the light stabilizer are preferably used in combination as the (F) component. This allows light resistance, in particular, light discoloration resistance to be further enhanced, and heat aging resistance to be further improved. In the case where (f1) the ultraviolet absorber and (f2) the light stabilizer are used in combination, a mass ratio of the (f1) ultraviolet absorber to the (f2) light stabilizer ((f1)/(f2)) is preferably 1/99 to 99/1, more preferably 5/95 to 95/5, and further preferably 10/90 to 50/50.

In the resin composition of the present embodiment, the total amount of the (F) component ((f1) ultraviolet absorber and/or (f2) light stabilizer) is preferably 0.01 to 3 parts by mass and more preferably 0.05 to 3 parts by mass based on 100 parts by mass of the total amount of the (A) component, (B) component and (C) component. The total amount of the (F) component is preferably set to the above lower limit or more to thereby exert a much more excellent light resistance effect, and the total amount is preferably set to the above upper limit or less to thereby achieve a sufficient effect and a high economic performance.

In addition, in the case where the resin composition of the present embodiment contains the (A) to (D) components, the total amount of the (F) component ((f1) ultraviolet absorber and/or (f2) light stabilizer) is preferably 0.01 to 3 parts by mass and more preferably 0.05 to 3 parts by mass based on 100 parts by mass of the total amount of the (A) component, (B) component, (C) component and (D) component. The content of the (F) component is preferably set to the above lower limit or more as the total amount to thereby exert a much more excellent light resistance effect, and the content is preferably set to the above upper limit or less to thereby achieve a sufficient effect and a high economic performance.

The resin composition of the present embodiment may further contain an epoxy compound. This allows light discoloration resistance to be further enhanced, and heat aging resistance to be further improved. The epoxy compound here may be a compound having an epoxy group, and is preferably an aliphatic epoxy compound and more preferably an aliphatic epoxy compound having 3% or more of oxirane oxygen in terms of molecular structure. As a specific example of such an aliphatic epoxy compound, preferred is an epoxidized oil and fat or an epoxidized fatty acid ester each having 3% or more of oxirane oxygen in terms of molecular structure, more preferred is an epoxidized oil and fat having 3% or more of oxirane oxygen in terms of molecular structure, and further preferred is an epoxidized soybean oil having 6% or more of oxirane oxygen in terms of molecular structure.

The content of the epoxy compound is preferably 0.01 to 3 parts by mass and more preferably 0.1 to 2 parts by mass based on 100 parts by mass of the resin composition, in terms of light discoloration resistance.

[(G) Polyolefin]

The resin composition of the present embodiment preferably further contains (G) a polyolefin. The resin composition contains the (G) polyolefin to thereby further enhance release ability during molding and also to further enhance impact resistance. Specific examples of the (G) component may include, not particularly limited to, a low density polyethylene, a high density polyethylene, a linear low density polyethylene, polypropylene, an ethylene-propylene copolymer, an ethylene-butene copolymer, an ethylene-octene copolymer, and an ethylene-acrylate copolymer. An ethylene-propylene copolymer, an ethylene-butene copolymer, an ethylene-octene copolymer, and an ethylene-acrylate copolymer are generally an amorphous or low-crystalline copolymer. In these copolymers, other monomer may be co-polymerized as long as it has no additional influence on performances. For example, a component ratio of the amount of an ethylene monomer to the total amount of monomers other than ethylene (for example, propylene, butene, and octene) is not particularly limited, but the total amount of monomers other than ethylene in the (G) component is usually 5 to 50% by mol.

Among the above, a low density polyethylene and an ethylene-propylene copolymer are preferable from the viewpoints of enhancing impact resistance and enhancing release ability during molding. These polyolefins may be used alone or in combination of two or more thereof.

The melt flow rate (MFR; according to ASTM D-1238; 190° C., 2.16 kgf load) of the (G) component is preferably 0.1 to 50 g/10 min and more preferably 0.2 to 20 g/10 min.

The content of the (G) component is preferably 0.05 to 5 parts by mass, more preferably 0.1 to 3 parts by mass, and further preferably 0.5 to 2 parts by mass, based on 100 parts by mass of the total amount of the (A) component, (B) component and (C) component. The content of the (G) component is set to the above lower limit or more to thereby enable to further enhance release ability during molding, and the content is set to the above upper limit or less to thereby enable to further enhance peeling during molding and to exhibit excellent mechanical properties.

In the case where the resin composition of the present embodiment contains the (A) to (D) components, the content of the (G) component is preferably 0.05 to 5 parts by mass, more preferably 0.1 to 3 parts by mass, and further preferably 0.5 to 2 parts by mass, based on 100 parts by mass of the total amount of the (A) component, (B) component, (C) component and (D) component. The content of the (G) component is set to the above lower limit or more to thereby enable to further enhance release ability during molding, and the content is set to the above upper limit or less to thereby enable to further enhance peeling during molding and to exhibit excellent mechanical properties.

Other additives for plastic (for example, a dripping inhibitor, a plasticizer, an antistatic agent, a lubricant, a release agent, dye and pigment, and various inorganic fillers for plastics) can be, if necessary, added to the resin composition of the present embodiment as long as they do not impair the effects of the present embodiment. As the dripping inhibitor, a dripping inhibitor during burning, such as polytetrafluoroethylene, can be used, and as the plasticizer, antistatic agent, lubricant, release agent, dye and pigment, and various inorganic fillers for plastics, those generally used can be appropriately used.

Other polymer and oligomer can be further added to the resin composition of the present embodiment. Examples thereof may include a petroleum resin, a terpene resin and hydrogenated resins thereof, a coumarone resin, and a coumarone-indene resin for improving flowability; and a silicone resin and a phenol resin for improving flame retardancy.

[Loss Tangent (tan δ) of Hydrogenated Block Copolymer in Resin Composition]

In the resin composition of the present embodiment, the value of the loss tangent (tan δ) peak height ("tan δ peak height") of the (B) component in a dynamic viscoelasticity spectrum obtained by measurement of the resin composition at a frequency of 10 Hz, expressed by the following equation 1, is in the range of 0.075 to 0.120.

(Loss tangent (tan δ) peak height of (*B*) component)= (Peak height in chart)/(Content (% by mass) of (*B*) component in resin composition)  (Equation 1)

The tan δ peak height of the (B) component in the resin composition can be determined as follows. First, the loss tangent (tan δ) of the (B) component in the resin composition is determined by dynamic viscoelastic measurement of the resin composition. Specifically, the resin composition is molded into a test piece, and the test piece can be measured using a commercially available viscoelasticity measuring apparatus (for example, "EPLEXOR 500" manufactured by GABO in the Federal Republic of Germany). More specifically, the loss tangent (tan δ) of the test piece can be measured in the conditions of a frequency of 10 Hz and a temperature rise from −150° C. to 100° C. at a rate of temperature rise of 2° C./min. Herein, the tan δ peak of the (B) component usually appears in the range of −70° C. to +30° C.

The dynamic viscoelastic measurement can also be performed by preparing a sample from a molded body or molded product as long as the molded body or molded product can be processed by cutting or the like to have a shape mountable to jig for mounting a sample of measuring equipment.

Figure 2:
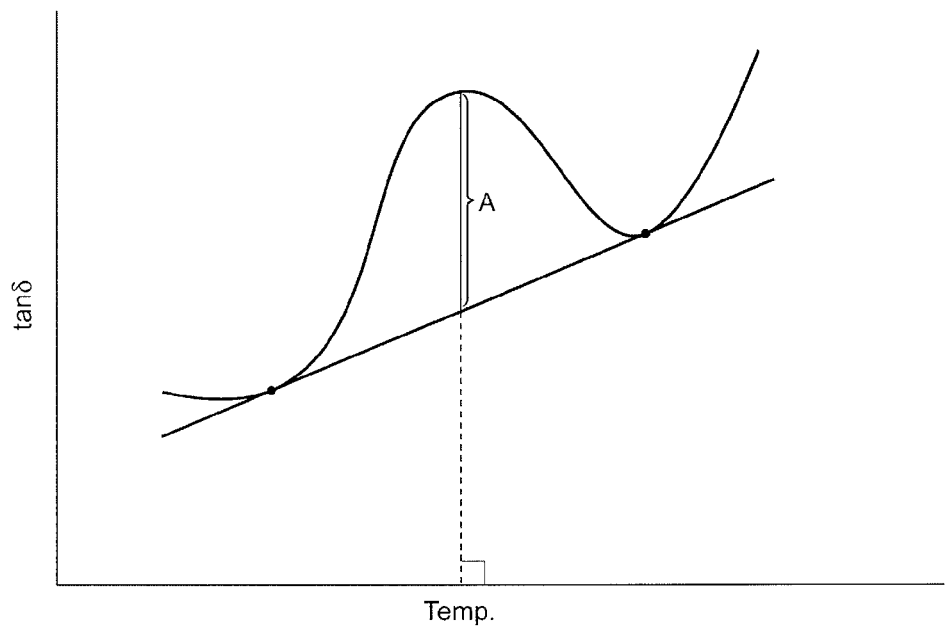
FIG. 2 illustrates a schematic diagram for describing one example of a method for determining the tan δ peak height of (B) component in the present embodiment.

Next, a method for determining the tan δ peak height of the (B) component is described with reference to the drawing. FIG. 2 illustrates a schematic diagram for describing an example of a method for determining the tan δ peak height of the (B) component in the present embodiment. In the loss tangent (tan δ) peak appearing in the dynamic viscoelasticity spectrum chart obtained by measurement (hereinafter, sometimes simply referred to as "peak in chart"), the tangent line from the starting point to the ending point of the peak in chart is drawn to determine the height (A) of the perpendicular line from the tangent line to the peak top (hereinafter, sometimes simply referred to as "peak height in chart"). Herein, the tangent line drawn from the starting point to the ending point of the peak may have a slope. The perpendicular line is to be drawn from the peak top to the tangent line so as to be perpendicular to the X-axis in chart.

Then, the peak height in chart can be divided by the content (% by mass) of the (B) component in the resin composition to thereby determine the loss tangent (tan δ) peak height of the (B) component (see Equation 1).

Herein, the content of the (B) component in the resin composition can be determined from compositional analysis of the resin composition, or the molded body or molded product. For example, in the case where compositional analysis of the resin composition containing the (A) component, the (B) component and the (C) component is performed, the resin composition is dissolved in chloroform to isolate the respective components by high-performance liquid chromatography (HPLC). Then, calibration curves for quantitative determination of the respective components are created in advance, and the contents of the respective components can be quantitatively determined based on the calibration curves for quantitative determination. Specifically, the content of the (B) component can be determined by a method described later in the section of Examples.

The weight average molecular weights of the respective components isolated can be each measured as a molecular weight in terms of styrene by gel permeation chromatography (GPC).

Then, the ratio of the polystyrene block to the conjugated diene compound polymer block in the (B) component can be determined by measuring measurement specimens isolated by high-performance liquid chromatography as described above by a nuclear magnetic resonance apparatus (NMR).

The tan δ peak height of the (B) component is presumed to be affected by the degradation of the (B) component. The tan δ peak height of the (B) component can be set to be in the above range to thereby exhibit a high impact resistance in the resin composition and to effectively suppress peeling during molding of the resin composition (however, the function effects of the present embodiment are not limited thereto.).

Furthermore, the tan δ peak height of the (B) component described above is preferably 0.090 to 0.120 and more preferably 0.090 to 0.115 from the viewpoint of causing no peeling even during molding of a thin molded body in which peeling is easily caused during molding.

In order to control the tan δ peak height of the (B) component in the present embodiment, for example, the thermal degradation of the (B) component may be controlled. For example, the tan δ peak height of the (B) component tends to increase by the increase in the amount of the (E) component added, the reduction in the temperature of a molten resin at the time of extruding, the increase in the molecular weight of the (B) component, the decrease in the content of the styrene block, or the like. For example, the tan δ peak height of the (B) component tends to decrease by the decrease in the amount of the (E) component added, the increase in the temperature of a molten resin at the time of extruding, the decrease in the molecular weight of the (B) component, the increase in the content of the styrene block, or the like.

As described above, the tan δ peak height of the (B) component is presumed to correspond to the degree of degradation of the (B) component. In the present embodiment, the degree of degradation of the (B) component can be controlled to thereby control the impact resistance and the peeling during molding of the resin composition. The tan δ peak height of the (B) component can be controlled by, for example, controlling the heat history during kneading. With respect to such a resin composition, since the amount of the (E) component added may also affect the tan δ peak height of the (B) component, a too large amount of the (E) component added may make it impossible to control the tan δ peak height of the (B) component within a desired range even if the heating during kneading is controlled. Alternatively, even if the (E) component is not compounded, the tan δ peak height of the (B) component may be uncontrollable within a desired range as long as the heating during kneading is not proper (however, the function effects of the present embodiment are not limited thereto.).

As described above, a relatively large amount of the heat stabilizer is often compounded to a commercially available hydrogenated block copolymer, and a too high content of the heat stabilizer tends to make it difficult to moderately degrade the hydrogenated block copolymer, controlling the tan δ peak height of the (B) component with difficulty. One preferable aspect for controlling the tan δ peak height of the (B) component in the range of 0.075 to 0.120 is to use the (B) component with no heat stabilizer compounded (or with a small amount of the heat stabilizer compounded), controlling the heat history during kneading.

[Method for Producing Resin Composition]

The resin composition of the present embodiment can be obtained by mixing the respective components in an extruder to melt and knead them. More specifically, when the (A) component, the (B) component, the (C) component, and the (D) component to be, if necessary, added are molten and kneaded using a twin screw extruder, the temperature of the molten resin composition to be extruded from a die outlet of the twin screw extruder is set to 300 to 350° C. from the viewpoint of controlling the tan δ peak height of the (B) component to 0.075 to 0.120.

FIG. 1 is a schematic diagram illustrating one embodiment of a method for producing the resin composition of the present embodiment. A twin screw extruder 1 has a driving portion 11 for driving a screw (not shown), and a die 12 for extruding the resin composition. Then, the twin screw extruder 1 is provided with a first raw material supply port F1 and a second raw material supply port (side feeder) F2 from the upstream side thereof, wherein a liquid injection port L1 for injecting a liquid material such as a liquid flame retardant is, if necessary, provided between the first raw material supply port F1 and the second raw material supply port F2. A vent port V1 is provided downstream of the second raw material supply port. An extruding process using the twin screw extruder 1 can provide the resin composition by supplying the above materials from the first raw material supply port F1, the second raw material supply port F2 and the liquid injection port L1, driving the screw by the driving portion 11 to thereby melt and knead the materials, and extruding the resultant from the die 12.

The twin screw extruder 1 for use in producing the resin composition of the present embodiment is suitably a counter-rotating or co-rotating twin screw extruder. In addition, while a supplying system as an incidental system is required, auxiliary raw materials such as other resin and additive can be supplied from, for example, the second raw material supply port (side feeder) F2.

The position at which each of the (A) component, (B) component and (C) component is supplied to the twin screw extruder 1 is not particularly limited, but is preferably set as follows, thereby making it possible to impart a more excellent heat aging resistance to the resin composition, in cooperation with the extruding conditions of a production method described later.

The (A) component is supplied to the twin screw extruder 1 from the first raw material supply port F1 located at the uppermost portion, and a part thereof is optionally supplied from the second raw material supply port F2 located at the middle portion. The (B) component and the (C) component can be supplied into the twin screw extruder 1 from the first raw material supply port F1 located at the uppermost portion and/or the second raw material supply port or liquid injection port L1 located at the middle portion of the former part, or from a third raw material supply port (not shown), which is, if necessary, provided.

Hereinafter, extruding conditions in a preferable method for producing the resin composition of the present embodiment will be described in detail. In order to effectively control the degradation of the (B) component, to enable to appropriately adjust the degree of degradation of the resin composition, and to control the tan δ peak height of the (B) component, the temperature of the molten resin composition extruded from the outlet of the die 12 (die outlet) of the twin screw extruder 1 (hereinafter, sometimes simply referred to as "resin temperature at the die outlet") is preferably set to 300 to 350° C., in addition to setting such composition that a small amount (for example, preferably, 0.1 parts by mass or less based on 100 parts by mass of the (B) component) of the (E) heat stabilizer or no (E) heat stabilizer is compounded in the resin composition. The temperature of the molten resin composition is more preferably 310 to 345° C. and further preferably 315 to 340° C. The temperature of the molten resin composition can be set within the above range to thereby further control the degradation of the (B) component. The temperature of the resin at the die outlet can be set to the above upper limit or less to thereby effectively control the rapid progress of degradation even if the hydrogenated block copolymer is degraded. The temperature of the resin at the die outlet can be set to the above lower limit or more to thereby sufficiently knead the resin composition of the present embodiment, exhibiting its performances. The amount of the (E) component may also affect the degradation of the (B) component as described above, and therefore a preferable die outlet may differ depending on the amount of the (E) component. For example, in the case of the composition not containing the (E) component, the temperature at the die outlet is preferably set to 300 to 350° C., and for example, in the case where the content of the (E) component based on 100 parts by mass of the (B) component is 0.001 to 0.1 parts by mass, the temperature at the die outlet is preferably set to 320 to 350° C.

The resin temperature at the die outlet can be controlled by adjusting the lengths of a non-melting and mixing zone and a melting zone described later, a screw configuration, the setting temperature of a barrel, a screw rotation speed, and the like. For example, the resin temperature at the die outlet can be controlled within the above range by adjusting the respective conditions depending on the ratio of the amounts and the types in the resin composition while the resin temperature at the die outlet is monitored.

While the resin temperature at the die outlet can be measured by inserting a thermometer to a resin strand exiting from the twin screw extruder, it can also be replaced with the measurement value of a thermometer at the die outlet, with which a commercially available twin screw extruder is equipped. However, since the temperature measured by the thermometer of the twin screw extruder tends to be often lower than the temperature directly measured, the value by the thermometer of the twin screw extruder is preferably corrected so that such a tendency is grasped and reflected to the measurement result, when being instead used.

At least any of the following conditions (1) to (8) can be adjusted to thereby effectively control the degradation of the (B) component, controlling the value of the tan δ peak height of the (B) component with a high degree of accuracy.

(1) The residence time of the resin composition in the twin screw extruder 1 is preferably 50 to 90 seconds, more preferably 50 to 80 seconds, and further preferably 50 to 70 seconds. As the residence time is longer, there is a tendency that the hydrogenated block copolymer is easily degraded and the molecular weight is easily decreased. The residence time in the extruder can be adjusted by the speeds of supply of the respective raw materials, the screw rotation speed, and the amount discharged from the extruder.

(2) The oxygen concentration at the first raw material supply port F1 is preferably 3% or less and more preferably 1% or less. Examples of a method for controlling the oxygen concentration at the first raw material supply port F1 may include a method in which an inert gas is supplied at an arbitrary part of a first raw material supply system (hopper, shooter, feeder, or the like; not shown) connected to the first raw material supply port F1 to thereby decrease the oxygen concentration. As described above, the (A) component is preferably in the form of powder, and a powdery polyphenylene ether is more preferably used because an inert gas such as nitrogen can be supplied to the supply port to thereby suppress the inclusion of oxygen entrained with the twin screw extruder 1.

In addition, it is preferable that the (A) component be supplied to the twin screw extruder 1 under an inert gas atmosphere having a low oxygen concentration, and other components also be supplied thereto under an inert gas atmosphere having a low oxygen concentration. This makes it possible to maintain the entire line, where the respective components are mixed, molten and extruded, under an atmosphere having a low oxygen concentration. As the oxygen concentration at the first raw material supply port F1 is lower, the change in the molecular weight of the (A) component due to oxidation can be suppressed, and the generation of foreign objects due to oxidative degradation can be suppressed.

(3) When the entire barrel length of the twin screw extruder 1 is assumed to be 100%, the barrel setting temperature of the former part of the barrel of the twin screw extruder 1 is preferably set to the glass transition temperature (Tg) of the (A) component or lower, and the barrel setting temperature of the latter part of the barrel of the twin screw extruder 1 is preferably set to 240 to 320° C. The barrel setting temperature of the former part of the barrel of the twin screw extruder 1 is more preferably set to 150 to 200° C. The barrel setting temperature of the latter part of the barrel of the twin screw extruder 1 is more preferably set to 250 to 300° C. FIG. 1 illustrating the twin screw extruder 1 shows a case where the vicinity of the first raw material supply port F1 is cooled by water, and the barrel setting temperature of the former part of the barrel (corresponding to the range from the upstream side to 40%) is set to 200° C. and the barrel setting temperature of the latter part of the barrel (corresponding to a range other than the former part; the range from the downstream side to 60%) is set to 280° C. Thus, the vicinity of the raw material supply port may also be cooled by water.

The former part of the barrel here preferably means the range from the upstream side of the twin screw extruder to 40% of the extruder length, more preferably means the range from the upstream side of the twin screw extruder to 50 to 75% of the extruder length. The latter part of the barrel here means a range other than the former part (range more downstream). That is, the former part of the barrel preferably occupies a region from the upstream side to 40% or more, more preferably occupies a region from the upstream side to 50 to 75%, of the twin screw extruder in the entire length of the barrel. In the present embodiment, with respect to the twin screw extruder, the region upstream of a first kneading zone (zone into which disks of the screw part are incorporated) is defined as the former part of the barrel, and the region downstream of the first kneading zone (zone into which disks of the screw part are incorporated) is defined as the latter part of the barrel. In this case, the region upstream of the first kneading zone (zone into which disks of the screw part are incorporated) corresponds to the former part of the barrel, which is the range from the upstream side of the twin screw extruder to 40% of the extruder length, more preferably the range from the upstream side to 50 to 75%. Then, the region downstream of the first kneading zone (zone into which disks of the screw part are incorporated) corresponds to the latter part of the barrel.

FIG. 1 exemplifies a case where the range from the upstream side to 40% of the barrel length is defined as the former part of the barrel and the range other than the former part (range more downstream) is defined as the latter part of the barrel in the twin screw extruder 1. That is, the former part of the barrel is provided with the first raw material supply port F1, the second raw material supply port F2 and the liquid injection port L1, and the latter part of the barrel is provided with the vent port V1.

The barrel setting temperature of the former part of the barrel of the twin screw extruder 1 is preferably controlled so that the (A) component is not molten. More specifically, the barrel setting temperature of the former part is more preferably the glass transition temperature (Tg) of the (A) component or lower. The barrel setting temperature of the former part of the barrel of the twin screw extruder 1 can be set to the glass transition temperature (Tg) of the (A) component or lower to thereby efficiently mix the respective components and to smoothly perform melting and kneading in the latter part of the barrel. In addition, such a setting temperature is preferable because excess heating of the (B) component is suppressed and the degradation of the (B) component can be moderately controlled. The glass transition temperature (Tg) of the (A) component here can be measured by a differential scanning calorimeter (DSC).

(4) The twin screw extruder 1 preferably has such a screw configuration that the former part of the barrel has a screw configuration in which no element other than a forward-conveying (right-handed screw element) screw element and a forward-conveying (phase of less than 45 degrees) kneading element (hereinafter, sometimes designated as "R") is used, and the latter part of the barrel has a screw configuration having at least two of a forward-conveying (phase of less than 45 degrees) kneading element as an essential member, and a neutral (phase of 90 degrees) kneading element (hereinafter, sometimes designated as "N"), a backward-conveying (negative phase of less than 45 degrees) kneading element (hereinafter, sometimes designated as "L") and a backward-conveying (left-handed screw element) screw element (hereinafter, sometimes designated as "Ls").

The forward-conveying element can be used in the former part of the barrel of the twin screw extruder 1 to thereby efficiently mix the respective components. In particular, the condition (4) can be combined with the condition (3) to thereby allow raw materials to be efficiently mixed. In addition, such a condition is preferable because it can allow excess heating of the (B) component to be suppressed and the degradation of the (B) component to be moderately controlled. In addition, the above two or more elements described regarding the latter part of the barrel can be used to thereby allow the respective components to be completely molten and mixed.

(5) A vacuum degassing zone for removing a volatile component and a product of decomposition from the molten resin is preferably provided downstream of the melting and kneading zone. The vacuum degassing zone can be provided by, for example, arranging the vent port V1 in the latter part of the barrel as illustrated in FIG. 1. The screw of the vacuum degassing zone preferably has a screw configuration in which a conveying screw element such as a double-flight right-hand screw is used so that shear is hardly applied.

(6) The screw rotation speed of the twin screw extruder 1 is preferably 150 to 700 rpm, more preferably 300 to 650 rpm, and further preferably 400 to 600 rpm. The screw rotation speed can be set to 700 rpm or less to thereby suppress rapid degradation of the (B) component due to the rise in resin temperature. In addition, the screw rotation speed can be set to 150 rpm or more to thereby prevent the residence time of raw materials in the twin screw extruder 1 from being too long, effectively suppressing the degree of degradation of the (B) component and also effectively controlling the tan δ peak height of the (B) component.

(7) In the case where the (C) component is liquid, a method for supplying the (C) component is preferably a method in which the (C) component is premixed with the (A) component, or the (A) component and the (B) component are supplied from the first raw material supply port F1 located upstream of the twin screw extruder 1 and the (C) component is supplied (side-fed) by injection addition from the liquid supply port L1 located downstream of the first raw material supply port F1.

For example, in the case where a (C) component including a liquid organic phosphate compound is side-fed by injection addition, a kneading disk R forward-conveying screw element (L/D=1.0 to 1.5), combined at a staggered angle of 15 to 75 degrees) is preferably used to mix the (A) component with a flame retardant of a liquid phosphate compound. In addition, in a method for side-feeding a (C) component including a liquid phosphate compound, which is not particularly limited, the (C) component can be fed from an injection nozzle to the side of an extruder by using, for example, a gear pump or a plunger pump. In the case where a flame retardant of a solid phosphate compound is compounded, it is supplied together with other components from the first raw material supply port F1 located upstream of the twin screw extruder 1, or side-fed from the second raw material supply port F2 provided downstream of the first raw material supply port F1. While there has been described the case where an organic phosphorus-based flame retardant including a liquid phosphate compound is used, the flame retardant can be fed by an appropriately suitable method depending on the type and form of the flame retardant (liquid, solid, or the like).

In addition, in the case where a compound having an effect of plasticizing the (A) component, among the aromatic condensed phosphate compounds, is used, the condition (7) can be combined with the condition (4) to allow such an aromatic condensed phosphate compound to plasticize the (A) component during melting and kneading in the latter part of the barrel of the twin screw extruder 1, enabling melting and kneading at a lower temperature. Therefore, the condition (7) is more preferable because it can allow the degradation of the (B) component to be effectively suppressed.

(8) In the case where the (D) component is compounded, the (D) component is preferably supplied from the second raw material supply port F2 using the twin screw extruder 1 having the second raw material supply port F2 in the latter part of the barrel. That is, in the case where the (D) component is compounded, the (A) component, the (B) component and the like are preferably supplied from the first raw material supply port F1 in the former part of the barrel, and the (D) component is preferably supplied from the second raw material supply port F2 in the latter part of the barrel. In addition, in the case where the (D) component and the (G) component are compounded, the (D) component and the (G) component are preferably supplied from the second raw material supply port F2. While these can also be, of course, supplied together with the (A) component and the (B) component from the first raw material supply port F1 located upstream of the twin screw extruder 1, these are preferably side-fed from the second raw material supply port F2 in the latter part of the barrel of the twin screw extruder 1 from the viewpoint of suppressing pyrolysis. In addition, in the case where the (E) component is compounded, it is preferably supplied together with the (A) component, the (B) component and the like from the first raw material supply port F1 in the former part of the barrel of the twin screw extruder 1.

The resin composition of the present embodiment can be molded into a molded body. A molding method is not particularly limited, but is preferably an injection molding method by an injection molding machine. The molded body can be suitably used for a junction box for solar battery modules, a connector for solar battery modules, and the like.

The resin composition of the present embodiment can be used as a material for various imaging devices such as television, as well as home electronics and OA equipment parts, and the like. In particular, the resin composition can be used as a material suitable for applications of electric/electronic inner parts required for having a high heat resistance, heat aging resistance and flame retardancy, especially, suitable for deflection yokes of television inner parts, solar battery module parts, and the like. Examples of solar battery module parts may include connectors and junction boxes. Solar battery modules are often placed outside for a long period of time, and thus are demanded for maintaining excellent heat resistance, heat aging resistance and weather resistance over a long period. In addition, these are also demanded for having such impact resistance as to be able to withstand impact by tools during placing and constructing. Since the resin composition of the present embodiment has a high impact resistance, hardly causes peeling during molding, is excellent in flame retardancy, heat resistance, and heat aging resistance for a long period, and is also excellent in weather resistance, the resin composition can sufficiently meet properties required for these parts.

The resin composition can be used for products adapted to various UL Standard (Underwriters Laboratories Inc.), TUV Standard (TUV Rheinland (trademark)), and the like which solar battery module parts are required to meet, with respect to connectors and junction boxes for solar battery modules.

EXAMPLES

Hereinafter, the present invention will be described based on Examples, but is not intended to be limited to the following Examples. Respective components used in Examples and Comparative Examples are as follows.

(A) Polyphenylene Ether (PPE)

Poly-2,6-dimethyl-1,4-phenylene ether, product name "Xyron S201A" manufactured by Asahi Kasei Chemicals Corporation, (glass transition temperature (Tg): 218° C.), differential scanning calorimeter (DSC; DSC-7 manufactured by PerkinElmer Co., Ltd.) was used to perform measurement with a temperature rise from 40° C. to 250° C. at a rate of temperature rise of 40° C./min.

(B) Hydrogenated Block Copolymer

A hydrogenated block copolymer (bond structure of polystyrene-poly(ethylene-butylene)-polystyrene) obtained by hydrogenating a styrene-butadiene block copolymer (bond structure of polystyrene-polybutadiene-polystyrene), shown below, was used.

(SEBS-1): hydrogenated block copolymer (weight average molecular weight: about 260,000; polystyrene block: about 32% by mass, weight average molecular weight of polystyrene block: about 41,600; hydrogenation rate of butadiene unit: 97% or more; no heat stabilizer contained), product name "TAIPOL SEBS-6151" manufactured by TSRC Corporation.

(SEBS-2): hydrogenated block copolymer (weight average molecular weight: about 390,000; polystyrene block: about 31% by mass, weight average molecular weight of polystyrene block: about 60,450; hydrogenation rate of butadiene unit: 98% or more; no heat stabilizer contained), product name "TAIPOL SEBS-6159" manufactured by TSRC Corporation.

(SEBS-3): hydrogenated block copolymer (weight average molecular weight: about 80,000; polystyrene block: about 29% by mass, weight average molecular weight of polystyrene block: about 11,600; hydrogenation rate of butadiene unit: 97% or more; no heat stabilizer contained), product name "TAIPOL SEBS-6152" manufactured by TSRC Corporation.

(SEBS-4): hydrogenated block copolymer was synthesized by an ordinary method, having a structure of polystyrene (1)-hydrogenated polybutadiene-polystyrene (2), (amount of bound styrene: 33%; weight average molecular weight: 170,000; molecular weight distribution: 1.10; amount of 1,2-vinyl bond of polybutadiene before hydrogenation: 46%; weight average molecular weight of polystyrene (1) block: 28,000; weight average molecular weight of polystyrene (2) block: 28,000; hydrogenation rate of polybutadiene block: 99.9%).

(SEBS-5): hydrogenated block copolymer was synthesized by an ordinary method, having a structure of polystyrene (1)-hydrogenated polybutadiene-polystyrene (2)-hydrogenated polybutadiene, (amount of bound styrene: 60%; weight average molecular weight: 80,000; molecular weight distribution: 1.05; amount of 1,2-vinyl bond of polybutadiene before hydrogenation: 44%; weight average molecular weight of polystyrene (1) block: 24,000; weight average molecular weight of polystyrene (2) block: 24,000; hydrogenation rate of polybutadiene block: 99.9%).

The weight average molecular weight of the (B) component as a raw material before the formation of the resin composition was determined as a molecular weight in terms of styrene by gel permeation chromatography (GPC). Measurement conditions of GPC were as follows.

GPC: Standard polystyrene was used in gel permeation chromatography "HL-802RTS" manufactured by Tosoh Corporation to create a calibration curve for measurement. For the standard polystyrene, used were those each having a weight average molecular weight of 264, 364, 466, 568, 2,800, 16,700, 186,000, and 1,260,000. A column used was one in which TSKgelG2500HXL, TSKgelG3000HXL, TSKgelG4000HXL and TSKgelG5000HXL manufactured by Tosoh Corporation were connected in series. The measurement was performed using chloroform as a solvent at a flow rate of the solvent of 0.9 mL/min and at a temperature of the column of 40° C., and using a differential refractometer detector (R.I) as a detector.

The hydrogenation rate was measured by a nuclear magnetic resonance apparatus (NMR; apparatus name: DPX-400, manufactured by BRUKER in Germany). As a measurement specimen, used was a solution obtained by dissolving a hydrogenated block copolymer in deuterated tetrahydrofuran.

The content of the polystyrene block was measured by the above osmium tetroxide decomposition method with the use of a block copolymer before hydrogenation. The block copolymer was decomposed using a 0.1 g/125 mL solution of osmic acid in tert-butanol.

(C) Flame Retardant

Phosphate-based flame retardants shown below were used.

(FR-1) flame retardant containing as a main component bisphenol A-based condensed phosphate (aromatic condensed phosphate compound; corresponding to the formula (IV)): product name "CR-741", manufactured by Daihachi Chemical Industry Co., Ltd.

(FR-2) flame retardant containing as a main component biphenyl-based condensed phosphate (aromatic condensed phosphate compound; corresponding to the formula (I)): product name "Adekastab FP-800", manufactured by Adeka Corporation. FR-2 is particularly excellent in hydrolysis resistance as compared with FR-1.

(D) Polystyrene (PS) homopolystyrene: product name "PSJ-polystyrene 685", manufactured by PS Japan Corporation (E) Heat Stabilizer (STB) hindered phenol-based heat stabilizer (antioxidant): product name "IRGANOX 1076", purchased from Toyotsu Chemiplas Corporation (octadecyl-3-(3,5-di-t-butyl-4-hydroxyphenyl)propionate)

(F) Light Stabilizer (HALS) hindered amine-based light stabilizer: product name "JF-90", manufactured by Johoku Chemical Co., Ltd. (bis(2,2,6,6-tetramethyl-4-piperidine)sebacate)

(G) Polyolefin;

(LDPE) low density polyethylene; product name "Suntech LD M2004", manufactured by Asahi Kasei Chemicals Corporation (melt flow rate measured at 190° C. and a load of 2.16 kgf according to ASTM D-1238: 0.4 g/10 min) was used.

[Characterization Method and the Like]

Characterization of the resulting resin composition was performed by the following methods and conditions.

(Preparation of Test Piece)

The resulting resin composition pellet was dried at 100° C. for 2 hours, and thereafter a test piece was prepared using an injection molding machine, IS-100GN Model, manufactured by Toshiba Machine Co., Ltd. (set at a cylinder temperature of 280° C. and at a mold temperature of 80° C.) according to ISO-15103.

(1) Charpy impact strength: the test piece was used to prepare a notched test piece according to ISO-179 for impact resistance evaluation, and the Charpy impact strength of the notched test piece was measured.

(2) Heat aging resistance

The above test piece was used to perform aging in an air circulating oven set at 120° C. for 500 hours and then left to stand under conditions of room temperature, 23° C., and a humidity of 50% for 24 hours. Thereafter, the test piece was used to prepare a notched test piece according to ISO-179, and the Charpy impact strength of the notched test piece was measured to determine the magnitude of the change in impact resistance (retention ratio to the Charpy impact strength before heat aging; %).

(3) Bending elastic modulus: the test piece was used to measure the bending elastic modulus at a test rate of 2 mm/min according to ISO-178 for bending elastic modulus evaluation.

(4) Deflection temperature under load (DTUL): the test piece was used to measure the deflection temperature under a load of 1.8 MPa according to ISO-75-1 for heat resistance evaluation.

(5) Flame retardancy

An injection molding test piece having a thickness of 1.5 mm was used to perform a burning test based on UL-94 vertical burning test (V-0, V-1, V-2 Ranks). Flame was brought into contact with the five test pieces each two times, ten times in total to measure the average and maximum flame-out times by seconds, and the results were ranked based on the following criteria.

(UL94 Vertical Flammability Test (V))

V-0: a total burning time of the five test pieces (each was exposed to the first flame-contacting and the second flame-contacting) was 50 seconds or less and a maximum burning time was 10 seconds or less, and the five test pieces had dripped no spark causing the ignition of absorbent cotton placed downward the pieces during burning.

V-1: a total burning time of the five test pieces (each was exposed to the first flame-contacting and the second flame-contacting) was 250 seconds or less and a maximum burning time was 30 seconds or less, and the five test pieces had dripped no spark causing the ignition of absorbent cotton placed downward the pieces during burning.

V-2: t a total burning time of the five test pieces (each was exposed to the first flame-contacting and the second flame-contacting) was 250 seconds or less and a maximum burning time was 30 seconds or less.

(6) Peeling property during molding

The resulting resin composition pellet was dried at 100° C. for 2 hours, and then injection-molded at an injection rate of 95% in a mold having a pin gate of 2 mm in diameter at an upper portion thereof and measuring 150 mm-square and 2 mm thick by using an injection molding machine, IS-100GN Model, manufactured by Toshiba Machine Co., Ltd. (set at a cylinder temperature of 300° C. and at a mold temperature of 80° C.). The state of the gate portion was visually observed with respect to ten test pieces from the 6-th shoot to the 15-th shoot, and the results were evaluated based on the following criteria.

(Criteria)

A: No peeling was observed.
B: Peeling area was less than 1 mm².
C: Peeling area was 1 to 10 mm².
D: Peeling area was more than 10 mm².

Herein, it is determined that if the evaluation result is "B" or higher, peeling property is not problematic for practical use. In particular, the evaluation result "A" means that no peeling phenomenon was detected in the molded body of the resin composition.

(7) Loss tangent (tan δ) peak height of (B) component in resin composition

The loss tangent (tan δ) peak height of the (B) component in the resin composition was measured using a viscoelasticity measuring apparatus ("EPLEXOR 500" manufactured by GABO in Federal Republic of Germany). The resulting resin composition pellet was dried at 100° C. for 2 hours, and thereafter a test piece having a thickness of 1.57 mm, a width of 7.15 mm, and a length of 127 mm was prepared using an injection molding machine, IS-100GN Model, manufactured by Toshiba Machine Co., Ltd. (set at a cylinder temperature of 300° C. and a mold temperature of 80° C.), to measure the loss tangent (tan δ) of the test piece in conditions of a frequency of 10.0 Hz and a temperature rising from −150° C. to 100° C. at a rate of temperature rise of 2° C./min. The tan δ peak of the (B) hydrogenated block copolymer usually appears in the range of −70° C. to +30° C.

First, in the loss tangent (tan δ) peak (peak in chart) of (B) the hydrogenated block copolymer appearing in the dynamic viscoelasticity spectrum chart obtained by the measurement, the tangent line from the starting point temperature to the ending point temperature of the peak in chart was drawn to determine the height of the perpendicular line from the tangent line to the peak top (height of perpendicular line of peak in chart). Then, as shown in the following formula (1), a solution obtained by dividing the height of the perpendicular line by the weight ratio of the (B) hydrogenated block copolymer in the resin composition (weight of (B) hydrogenated block copolymer/weight of resin composition) was defined as the loss tangent (tan δ) peak height (tan δ peak height) of the (B) hydrogenated block copolymer.

(Loss tangent (tan δ) peak height of (B) component)=
(Peak height in chart)/(Content (% by mass) of
(B) component in resin composition)     (Equation 1)

(8) Weight average molecular weight of (B) component in resin composition

After the formation of the resin composition, the weight average molecular weight of the (B) component in the resin composition was measured and compared with the weight average molecular weight of the (B) component before the formation of the resin composition. The weight average molecular weight of the (B) component in the resin composition was measured as follows.

First, the resin composition was dissolved in chloroform to prepare a chloroform solution having a concentration of 1%. The resulting chloroform solution was subjected to high-performance liquid chromatography (HLPC) to thereby collect the (B) component from the resin composition. Herein, measurement conditions of HLPC were as follows.

Main body: high-pressure gradient system LC-717 (manufactured by Waters)
Detector: evaporative mass detector 1000 Model (manufactured by Polymer Laboratories Ltd.)
Column: OASIS column 4.6 mm×150 mm
Mobile phase solvent: chloroform
Mobile phase flow rate: 1.2 mL/min The component corresponding to the (B) component collected by HPLC was subjected to gel permeation chromatography (GPC) to determine the weight average molecular weight as a molecular weight in terms of styrene. Herein, measurement conditions of GPC were as follows.

GPC: Standard polystyrene was used in gel permeation chromatography "HL-802RTS" manufactured by Tosoh Corporation to create a calibration curve for measurement. For the standard polystyrene, used were those each having a weight average molecular weight of 264, 364, 466, 568, 2,800, 16,700, 186,000, and 1,260,000. A column used was one in which TSKgelG2500HXL, TSKgelG3000HXL, TSKgelG4000HXL and TSKgelG5000HXL manufactured by Tosoh Corporation were connected in series. The measurement was performed using chloroform as a solvent at a flow rate of the solvent of 0.9 mL/min and at a temperature of the column of 40° C., and using a differential refractometer detector (R.I) as a detector.

Example 1

A resin composition by compounding shown in Table 1 was prepared in the following production conditions. Materials according to formulation described in Table 1 were supplied to a twin screw extruder equipped with a low-pressure vent port, having a structure illustrated in FIG. 1, and having a screw diameter of 58 mm and a barrel number of 13 ("TEM58SS" manufactured by Toshiba Machine Co., Ltd.), and molten and kneaded in conditions described in Table 1. Herein, the (C) component was supplied by being fed and extruded using a gear pump from a pressing (liquid) injection port located at barrel 7 downstream of a first supply port (barrel 7 denotes the seventh barrel as counted from the upstream side of the barrel. The same will apply hereinafter with respect to the numeration of the barrel). The extruded strand was cooled and cut to provide a resin composition pellet.

With respect to the screw configuration of an extruder, a region corresponding to about 69% of the entire barrel length was defined as the former part (unmelting to semi-melting and mixing) zone, and a region corresponding to the remaining barrel length, about 31%, was the latter part zone of the barrel (melting and kneading zone). Melting and kneading, and extruding were performed in conditions of the following barrel setting temperatures: barrel 1: cooling with water, barrel 2: 150° C., barrels 3 to 8: 200° C., barrel 9: 250° C., barrels 10 to 13: 280° C.; die: 290° C.; a screw rotation speed of 400 rpm, and an amount of discharge of 400 kg/hour, to provide a resin composition pellet. In this case, barrels 1 to 9 were assigned to the former part zone of the barrel, and barrels 10 to 13 were assigned to the latter part zone of the barrel. Herein, a vacuum degassing port was provided at barrel 11 for degassing under reduced pressure at about 100 hPa. In addition, nitrogen was supplied from a lower portion of the first supply port at about 30 L/min, wherein the oxygen concentration of an upper portion of the first supply port was about 2.0%. Herein, the oxygen concentration was measured by inserting a sensor (with wire), "digital oxygen concentration XO-326ALA" manufactured by As One Corporation, from the first supply port to create a sealed state. The temperature of the molten resin composition at a die outlet was actually measured, and found to be 324° C. Then, the resulting resin composition pellet was evaluated by the evaluation method to obtain the results in Table 1.

Examples 2 to 18, Comparative Examples 1 to 7, 9 to 12

Each resin composition pellet was prepared in the same operation as in Example 1 except that the formulation and conditions were those described in Tables 1 to 4. However, in Example 13, since a flame retardant was solid (powder), (C) FR-2 was supplied together with other components from the first supply port at barrel 1 at the upstream side in the flowing direction of the extruder. In addition, in Example 9, (D) PS was supplied from a second supply port (barrel 9). Each resin composition pellet obtained was evaluated in the same manner to obtain the results in Tables 1 to 4. Herein, legends with respect to screw elements in Tables are as follows:

R: forward-conveying (phase of less than 45 degrees) kneading element was used.
N: neutral (phase of 90 degrees) kneading element was used.
L: backward-conveying (negative phase of less than 45 degrees) kneading element was used.
RR: two forward-conveying (phase of less than 45 degrees) kneading elements were used.
RRNL: two forward-conveying (phase of less than 45 degrees) kneading elements, one neutral (phase of 90 degrees) kneading element, and one backward-conveying (negative phase of less than 45 degrees) kneading element were sequentially incorporated and used.

Comparative Example 8

(A) polyphenylene ether, (B) a hydrogenated block copolymer, and (C) a phosphate-based compound were molten and kneaded by the formulation and supplying method, and the extruding conditions shown in Table 4 according to the method described in Japanese Patent Laid-Open Publication No. 10-087984, to provide a pellet. Herein, the screw rotation speed and the amount of discharge corresponded to the conditions in Japanese Patent Laid-Open Publication No. 10-087984 in consideration of the size of the extruder, wherein the amount of discharge was increased in multiples of the volume ratio depending on difference in the size of the extruder, and the screw rotation speed was adapted so that the same linear velocity at the outermost surface was achieved.

TABLE 1

| (Formulation) | Component: parts by mass | Charging port | Example 1 | Example 2 | Example 3 | Example 4 | Example 5 | Example 6 | Example 7 | Example 8 | Example 9 |
|---|---|---|---|---|---|---|---|---|---|---|---|
| (A) | PPE | First | 58 | 70 | 76 | 83 | 58 | 70 | 76 | 83 | 70 |
| (B) | SEBS-1(6151) | | 22 | 15 | 11 | 6 | 22 | 15 | 11 | 6 | 10 |
| | SEBS-2(6159) | | | | | | | | | | |
| | SEBS-3(6152) | | | | | | | | | | |
| (C) | FR-1 | Liquid addition | 20 | 15 | 13 | 11 | 20 | 15 | 13 | 11 | 15 |
| | FR-2 | First | | | | | | | | | |
| (D) | PS | First | | | | | | | | | |
| | PS | Second | | | | | | | | | 5 |
| (E) | STB | First | | | | | 0.02 | 0.01 | 0.01 | 0.005 | 0.01 |
| (F) | HALS | | | | | | | | | | |
| (G) | LDPE | | | | | | | | | | |
| | EP | | | | | | | | | | |
| Content (parts by mass) of (E) based on 100 parts by mass of (B) | | | 0.000 | 0.000 | 0.000 | 0.000 | 0.091 | 0.067 | 0.091 | 0.083 | 0.100 |

TABLE 1-continued

| | | Units | Example 1 | Example 2 | Example 3 | Example 4 | Example 5 | Example 6 | Example 7 | Example 8 | Example 9 |
|---|---|---|---|---|---|---|---|---|---|---|---|
| (Melting and extruding conditions) | | | | | | | | | | | |
| Oxygen concentration at first supply port | | % | 2 | 2.1 | 2.3 | 2.4 | 2.1 | 2.1 | 2.3 | 2.4 | 2.1 |
| Former part | Proportion of former part | % | 75 | 75 | 75 | 75 | 75 | 75 | 75 | 75 | 75 |
| | Temperature of former part | °C. | 200 | 200 | 200 | 200 | 200 | 200 | 200 | 200 | 200 |
| | Screw element | | RR | RR | RR | RR | RR | RR | RR | RR | RR |
| Latter part | Proportion of latter part | % | 25 | 25 | 25 | 25 | 25 | 25 | 25 | 25 | 25 |
| | Temperature of latter part | °C. | 280 | 280 | 280 | 280 | 280 | 280 | 280 | 280 | 280 |
| | Screw element | | RRNL | RRNL | RRNL | RRNL | RRNL | RRNL | RRNL | RRNL | RRNL |
| Screw rotation speed | | Rpm | 400 | 400 | 400 | 400 | 400 | 400 | 400 | 400 | 400 |
| Extrusion rate | | kg/hr | 400 | 400 | 400 | 400 | 400 | 400 | 400 | 400 | 400 |
| Resin temperature at die outlet | | °C. | 324 | 329 | 335 | 347 | 324 | 329 | 335 | 347 | 329 |
| (Material properties of composition) | | | | | | | | | | | |
| Charpy impact | ISO179 | kJ/m$^2$ | 45 | 36 | 23.0 | 17.0 | 45 | 36 | 24.0 | 19.0 | 25 |
| (Heat aging resistance) | | | | | | | | | | | |
| 120° C. | Charpy impact | kJ/m$^3$ | 31 | 27 | 14.4 | 7.4 | 31 | 28 | 15 | 9.8 | 14 |
| 500 hr | Retention ratio | % | 69% | 75% | 63% | 44% | 69% | 78% | 63% | 52% | 56% |
| Bending elastic modulus | ISO178 | MPa | 2020 | 2150 | 2530 | 2770 | 2025 | 2140 | 2520 | 2760 | 2240 |
| DTUL | ISO75-1, 1.8 MPa | °C. | 91 | 116 | 126 | 137 | 92 | 116 | 127 | 138 | 114 |
| Flame retardancy | UL-94, 1.5 mm | Rank | V-1 | V-0 | V-0 | V-0 | V-1 | V-0 | V-0 | V-0 | V-0 |
| Peeling property | | | A | A | A | B | B | A | A | A | A |
| Tanδ peak height | | | 0.108 | 0.098 | 0.091 | 0.077 | 0.115 | 0.104 | 0.095 | 0.091 | 0.106 |
| Mw of (B) component in resin composition | | ×10,000 | 21.5 | 20.8 | 19.3 | 16.3 | 24.2 | 23.9 | 22.6 | 21.0 | 23.4 |

*Mw: Weight average molecular weight

TABLE 2

| (Formulation) | Component: parts by mass | Charging port | Example 10 | Example 11 | Example 12 | Example 13 | Example 14 | Example 15 | Example 16 | Example 17 | Example 18 |
|---|---|---|---|---|---|---|---|---|---|---|---|
| (A) | PPE | First | 70 | 70 | 70 | 70 | 70 | 70 | 70 | 70 | 70 |
| (B) | SEBS-1(6151) | | 13 | 15 | 15 | | | | | | 15 |
| | SEBS-2(6159) | | | | | 15 | 15 | 15 | 15 | 15 | |
| | SEBS-3(6152) | | | | | | | | | | |
| (C) | FR-1 | Liquid addition | 15 | 15 | 15 | 15 | 15 | 15 | 15 | 15 | |
| | FR-2 | First | | | | | | | | | 15 |
| (D) | PS | First | | | | | | | | | |
| | PS | Second | | | | | | | | | |
| (E) | STB | First | 0.01 | 0.01 | 0.01 | 0.015 | 0.013 | 0.01 | 0.002 | | 0.01 |
| (F) | HALS | | | 0.5 | 3 | | | | | | |
| (G) | LDPE | | 2 | | | | | | | | |
| | EP | | | | | | | | | | |
| Content (parts by mass) of (E) based on 100 parts by mass of (B) | | | 0.077 | 0.067 | 0.067 | 0.100 | 0.087 | 0.067 | 0.013 | 0.000 | 0.067 |

TABLE 2-continued

| | | Units | Example 10 | Example 11 | Example 12 | Example 13 | Example 14 | Example 15 | Example 16 | Example 17 | Example 18 |
|---|---|---|---|---|---|---|---|---|---|---|---|
| (Melting and extruding conditions) | | | | | | | | | | | |
| Oxygen concentration at first supply port | | % | 2.1 | 2.1 | 2.1 | 2.1 | 2.1 | 2.1 | 2.1 | 2.1 | 2.1 |
| Former part | Proportion of former part | % | 75 | 75 | 75 | 75 | 75 | 75 | 75 | 75 | 75 |
| | Temperature of former part | °C. | 200 | 200 | 200 | 200 | 200 | 200 | 200 | 200 | 200 |
| | Screw element | | RR | RR | RR | RR | RR | RR | RR | RR | RR |
| Latter part | Proportion of latter part | % | 25 | 25 | 25 | 25 | 25 | 25 | 25 | 25 | 25 |
| | Temperature of latter part | °C. | 280 | 280 | 280 | 280 | 280 | 280 | 280 | 280 | 280 |
| | Screw element | | RRNL | RRNL | RRNL | RRNL | RRNL | RRNL | RRNL | RRNL | RRNL |
| Screw rotation speed | | Rpm | 400 | 400 | 400 | 400 | 400 | 400 | 400 | 400 | 400 |
| Extrusion rate | | kg/hr | 400 | 400 | 400 | 400 | 400 | 400 | 400 | 400 | 400 |
| Resin temperature at die outlet | | °C. | 329 | 329 | 328 | 338 | 338 | 338 | 338 | 338 | 329 |
| (Material properties of composition) | | | | | | | | | | | |
| Charpy impact | ISO179 | kJ/m$^2$ | 33 | 35 | 33 | 32 | 34 | 35 | 31 | 29 | 38 |
| (Heat aging resistance) | | | | | | | | | | | |
| 120° C. | Charpy impact | kJ/m$^2$ | 23 | 27 | 28 | 20 | 23 | 25 | 20 | 18 | 32 |
| 500 hr | Retention ratio | % | 70% | 77% | 85% | 63% | 68% | 71% | 65% | 62% | 84% |
| Bending elastic modulus | ISO178 | MPa | 2180 | 2100 | 2080 | 2060 | 2080 | 2080 | 2090 | 2110 | 2220 |
| DTUL | ISO75-1, 1.8 MPa | °C. | 116 | 113 | 110 | 118 | 118 | 118 | 118 | 118 | 118 |
| Flame retardancy | UL-94, 1.5 mm | Rank | V-0 | V-0 | V-0 | V-0 | V-0 | V-0 | V-0 | V-0 | V-0 |
| Peeling property | | | A | A | A | B | A | A | A | B | A |
| Tanδ peak height | | | 0.106 | 0.108 | 0.104 | 0.117 | 0.105 | 0.094 | 0.081 | 0.076 | 0.105 |
| Mw of (B) component in resin composition | | ×10,000 | 23.7 | 24.2 | 22.8 | 36.5 | 33.4 | 31 | 27.6 | 25.2 | 23.8 |

*Mw: Weight average molecular weight

TABLE 3

| | | | Comparative Example 1 | Comparative Example 2 | Comparative Example 3 | Comparative Example 4 | Comparative Example 5 | Comparative Example 6 |
|---|---|---|---|---|---|---|---|---|
| (Formulation) | Component: parts by mass | Charging port | | | | | | |
| (A) | PPE | First | 58 | 70 | 76 | 83 | 58 | 83 |
| (B) | SEBS-1(6151) | | 22 | 15 | 11 | 6 | 22 | 6 |
| | SEBS-2(6159) | | | | | | | |
| | SEBS-3(6152) | | | | | | | |
| | SEBS-4 | Second | | | | | | |
| | SEBS-5 | First | | | | | | |
| (C) | FR-1 | Liquid addition | 20 | 15 | 13 | 11 | 20 | 11 |
| | FR-2 | First | | | | | | |
| (D) | PS | First | | | | | | |
| | PS | Second | | | | | | |
| (E) | STB | First | 0.05 | 0.05 | 0.03 | 0.02 | 0.05 | 0.02 |
| (F) | HALS | | | | | | | |
| (G) | LDPE | | | | | | | |
| | EP | | | | | | | |
| Content (parts by mass) of (E) based on 100 parts by mass of (B) | | | 0.227 | 0.333 | 0.273 | 0.333 | 0.227 | 0.333 |
| | | Units | | | | | | |
| (Melting and extruding conditions) | | | | | | | | |
| Oxygen concentration at first supply port | | % | 1.9 | 2.1 | 2.3 | 2.4 | 1.9 | 2.4 |
| Former part | Proportion of former part | % | 75 | 75 | 75 | 75 | 25 | 25 |
| | Temperature of former part | °C. | 200 | 200 | 200 | 200 | 280 | 280 |
| | Screw element | | RR | RR | RR | RR | RNL | RNL |
| Latter part | Proportion of latter part | % | 25 | 25 | 25 | 25 | 75 | 75 |
| | Temperature of latter part | °C. | 280 | 280 | 280 | 280 | 280 | 280 |
| | Screw element | | RRNL | RRNL | RRNL | RRNL | RRNL | RRNL |

TABLE 3-continued

|  |  |  | Comparative Example 1 | Comparative Example 2 | Comparative Example 3 | Comparative Example 4 | Comparative Example 5 | Comparative Example 6 |
| --- | --- | --- | --- | --- | --- | --- | --- | --- |
| Screw rotation speed |  | rpm | 400 | 400 | 400 | 400 | 400 | 400 |
| Extrusion rate |  | kg/hr | 400 | 400 | 400 | 400 | 400 | 400 |
| Resin temperature at die outlet |  | ° C. | 324 | 329 | 335 | 347 | 355 | 367 |
| (Material properties of composition) |  |  |  |  |  |  |  |  |
| Charpy impact | ISO179 | kJ/m$^2$ | 47 | 39 | 24.0 | 18.0 | 26 | 8.6 |
| (Heat aging resistance) |  |  |  |  |  |  |  |  |
| 120° C. | Charpy impact | kJ/m$^2$ | 34 | 27 | 15 | 9.8 | 12 | 2.2 |
| 500 hr | Retention ratio | % | 72% | 69% | 63% | 54% | 46% | 26% |
| Bending elastic modulus | ISO178 | MPa | 2080 | 2150 | 2530 | 2770 | 2110 | 2820 |
| DTUL | ISO75-1, 1.8 MPa | ° C. | 91 | 115 | 126 | 137 | 91 | 137 |
| Flame retardancy | UL-94, 1.5 mm | Rank | V-1 | V-0 | V-0 | V-0 | V-1 | V-0 |
| Peeling property |  |  | D | C | C | C | D | D |
| Tanδ peak height |  |  | 0.135 | 0.128 | 0.124 | 0.121 | 0.047 | 0.044 |
| Mw of (B) component in resin composition |  | ×10,000 | 25.8 | 25.6 | 25.7 | 24.2 | 12.7 | 10.4 |

*Mw: Weight average molecular weight

TABLE 4

|  |  |  | Comparative Example 7 | Comparative Example 8 | Comparative Example 9 | Comparative Example 10 | Comparative Example 11 | Comparative Example 12 |
| --- | --- | --- | --- | --- | --- | --- | --- | --- |
| (Formulation) | Component: parts by mass | Charging port |  |  |  |  |  |  |
| (A) | PPE | First | 70 | 73 | 58 | 70 | 70 | 70 |
| (B) | SEBS-1(6151) |  |  |  | 22 |  |  |  |
|  | SEBS-2(6159) |  |  |  |  |  | 15 | 15 |
|  | SEBS-3(6152) |  |  | 15 |  |  |  |  |
|  | SEBS-4 | Second |  |  | 18 |  |  |  |
|  | SEBS-5 | First |  |  |  | 15 |  |  |
| (C) | FR-1 | Liquid addition | 15 | 9 | 20 | 15 | 15 | 15 |
|  | FR-2 | First |  |  |  |  |  |  |
| (D) | PS | First |  |  |  |  |  |  |
|  | PS | Second |  |  |  |  |  |  |
| (E) | STB | First | 0.01 |  | 0.05 | 0.01 | 0.05 |  |
| (F) | HALS |  |  |  |  |  |  |  |
| (G) | LDPE |  |  |  |  |  |  |  |
|  | EP |  |  |  |  |  |  |  |
| Content (parts by mass) of (E) based on 100 parts by mass of (B) |  |  | 0.067 | 0.000 | 0.227 | 0.067 | 0.333 | 0.000 |
|  |  | Units |  |  |  |  |  |  |
| (Melting and extruding conditions) |  |  |  |  |  |  |  |  |
| Oxygen concentration at first supply port |  | % | 2.1 | 2.1 | 21.0 | 2.1 | 2.1 | 2.1 |
| Former part | Proportion of former part | % | 75 | 25 | 75 | 75 | 75 | 25 |
|  | Temperature of former part | ° C. | 200 | 320 | 200 | 200 | 200 | 320 |
|  | Screw element |  | RR | RRNL | RR | RR | RR | RRNL |
| Latter part | Proportion of latter part | % | 25 | 75 | 25 | 25 | 25 | 75 |
|  | Temperature of latter part | ° C. | 280 | 280 | 280 | 280 | 280 | 280 |
|  | Screw element |  | RRNL | RRNL | RRNL | RRNL | RRNL | RRNL |
| Screw rotation speed |  | rpm | 400 | 250 | 400 | 400 | 400 | 250 |
| Extrusion rate |  | kg/hr | 400 | 190 | 400 | 400 | 400 | 190 |
| Resin temperature at die outlet |  | ° C. | 329 | 369 | 330 | 329 | 337 | 381 |
| (Material properties of composition) |  |  |  |  |  |  |  |  |
| Charpy impact | ISO179 | kJ/m2 | 27 | 41 | 45 | 4 | 35 | 21 |
| (Heat aging resistance) |  |  |  |  |  |  |  |  |
| 120° C. | Charpy impact | kJ/m2 | 12 | 16 | 18 | 1.5 | 20 | 8 |
| 500 hr | Retention ratio | % | 44% | 39% | 40% | 38% | 57% | 38% |
| Bending elastic modulus | ISO178 | MPa | 2260 | 2110 | 2090 | 2450 | 2050 | 2160 |
| DTUL | ISO75-1, 1.8 MPa | ° C. | 116 | 133 | 92 | 112 | 118 | 116 |
| Flame retardancy | UL-94, 1.5 mm | Rank | V-0 | V-0 | V-1 | V-1 | V-0 | V-1 |
| Peeling property |  |  | D | C | D | A | D | D |
| Tanδ peak height |  |  | 0.101 | 0.071 | 0.068 | 0.054 | 0.139 | 0.068 |
| Mw of (B) component in resin composition |  | ×10,000 | 7.2 | 10.3 | 12.1 | 7.1 | 37.4 | 19.7 |

*Mw: Weight average molecular weight

As can be seen from Tables 1 to 4, it has been confirmed that the resin composition in each Example has a high impact resistance, causes no peeling during molding, and is excellent in flame retardancy, heat resistance, and heat aging resistance for a long period.

The present application is based on Japanese Patent Application No. 2011-136688 filed with Japan Patent Office on Jun. 20, 2011, the content of which is incorporated herein by reference.

INDUSTRIAL APPLICABILITY

The resin composition of the present invention is a flame retardant resin composition that is remarkably excellent in heat resistant temperature and heat aging property, that is favorable in terms of the environment, and that can be suitably utilized in the fields of imaging devices such as television, as well as home electronics and OA equipment parts, and the like. In particular, the resin composition can be used as a material suitable for applications of electric/electronic inner parts required for having a high heat resistance, heat aging resistance and flame retardancy, especially, suitable for deflection yokes of television inner parts, solar battery module parts, and the like.

REFERENCE SIGNS LIST

1: twin screw extruder, 11: driving portion, 12: die, F1: first raw material supply port, F2: second raw material supply port, L1: liquid injection port, V1: vent

What is claimed is:

1. A resin composition comprising (A) polyphenylene ether, (B) a hydrogenated block copolymer which is obtained by hydrogenating a block copolymer including a polystyrene block and a conjugated diene compound polymer block, and which has a weight average molecular weight of 100,000 to 500,000, and (C) an organic phosphorus-based flame retardant,
    wherein the resin composition comprises, based on 100 parts by mass of a total amount of the (A) component, the (B) component and the (C) component,
    57 to 94 parts by mass of the (A) component,
    3 to 30 parts by mass of the (B) component, and
    3 to 30 parts by mass of the (C) component; and
    wherein a value of a loss tangent (tan δ) peak height of the (B) component, represented by the following equation 1, in a dynamic viscoelasticity spectrum obtained by measurement of the resin composition at a frequency of 10 Hz is in a range of 0.075 to 0.120;

(Loss tangent (tan δ) peak height of (B) component)= (Peak height in chart)/(Content (% by mass) of (B) component in resin composition)   (Equation 1).

2. The resin composition according to claim 1, further comprising 0.5 to 20 parts by mass of (D) a styrene-based resin based on 100 parts by mass of the total amount of the (A) component, the (B) component and the (C) component.

3. The resin composition according to claim 1, comprising, based on 100 parts by mass of the total amount of the (A) component, the (B) component, the (C) component and the (D) component,
    65 to 90 parts by mass of the (A) component,
    4 to 25 parts by mass of the (B) component,
    5 to 25 parts by mass of the (C) component, and
    0.5 to 20 parts by mass of the (D) component.

4. The resin composition according to claim 1, wherein the value of the loss tangent (tan δ) peak height of the (B) component in a dynamic viscoelasticity spectrum obtained by measurement of the resin composition at a frequency of 10 Hz is in a range of 0.090 to 0.115.

5. The resin composition according to claim 1, further comprising 0.001 to 0.1 parts by mass of (E) a heat stabilizer based on 100 parts by mass of the (B) component.

6. The resin composition according to claim 1, wherein the content of the polystyrene block in the (B) component is 20 to 50% by mass.

7. The resin composition according to claim 1, containing as the (C) component a condensed phosphate compound represented by formula (I):

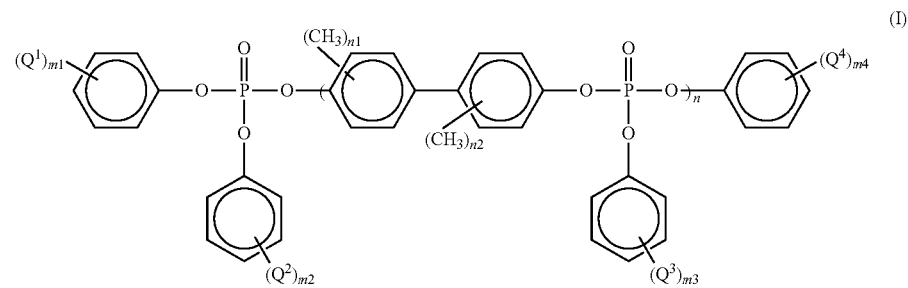

(wherein $Q^1$, $Q^2$, $Q^3$ and $Q^4$ each independently represent an alkyl group having 1 to 6 carbon atoms, n is an integer of 1 or more, $n^1$ and $n^2$ are each independently an integer of 0 to 2, and $m^1$, $m^2$, $m^3$ and $m^4$ are each independently an integer of 0 to 3).

8. The resin composition according to claim 1, further comprising (F) an ultraviolet absorber and/or a light stabilizer in an amount of 0.01 to 3 parts by mass in total based on 100 parts by mass of the total amount of the (A) component, the (B) component and the (C) component.

9. A method for producing the resin composition according to claim 1, comprising a step of melting and kneading the (A) component, the (B) component and the (C) component using a twin screw extruder,
    wherein a temperature of a molten resin composition extruded from a die outlet of a twin screw extruder is 300 to 350° C.

10. The method for producing the resin composition according to claim 9, wherein in the melting and kneading step, an oxygen concentration at at least one raw material supply port of the twin screw extruder is set to 3% or less.

11. The method for producing the resin composition according to claim 9, wherein when an entire barrel length of the twin screw extruder is assumed to be 100%, a range from an upstream side of a barrel to at least 40% of a barrel length is defined as a former part of the barrel and a remaining range is defined as a latter part of the barrel, a barrel setting temperature of the former part of the barrel is set to a temperature equal to or lower than the glass transition temperature (Tg) of the (A) polyphenylene ether, and a barrel setting temperature of the latter part of the barrel is set to 240 to 320° C.

12. The method for producing the resin composition according to claim 9, wherein the former part of the barrel comprises a screw configuration in which no element other than a forward-conveying (right-handed screw element) screw element and a forward-conveying (phase of less than 45 degrees) kneading element is used, and the latter part of the barrel comprises a screw configuration having at least two of a forward-conveying (phase of less than 45 degrees) kneading element as an essential member, and a neutral (phase of 90 degrees) kneading element, a backward-conveying (negative phase of less than 45 degrees) kneading element and a backward-conveying (left-handed screw element) screw element.

13. The method for producing the resin composition according to claim 9, wherein the twin screw extruder further comprises a second raw material supply port in the latter part of the barrel, and the (D) component is supplied from the second raw material supply port.

14. A molded body comprising the resin composition according to claim 1.

15. A solar battery module part comprising the resin composition according to claim 1.

16. A connector comprising the resin composition according to claim 1.

17. A junction box comprising the resin composition according to claim 1.

* * * * *

UNITED STATES PATENT AND TRADEMARK OFFICE
CERTIFICATE OF CORRECTION

PATENT NO. : 9,187,640 B2
APPLICATION NO. : 14/127775
DATED : November 17, 2015
INVENTOR(S) : H. Furukawa et al.

Page 1 of 1

It is certified that error appears in the above-identified patent and that said Letters Patent is hereby corrected as shown below:

In the Claims
Column 39, line 63 (claim 1, line 18) please change "to 0.120;" to -- to 0.120. --

Signed and Sealed this
Ninth Day of August, 2016

Michelle K. Lee
*Director of the United States Patent and Trademark Office*